(12) United States Patent
Burdette et al.

(10) Patent No.: US 10,495,485 B2
(45) Date of Patent: *Dec. 3, 2019

(54) MAGNETIC FIELD SENSORS AND OUTPUT SIGNAL FORMATS FOR A MAGNETIC FIELD SENSOR

(71) Applicant: Allegro MicroSystems, LLC, Manchester, NH (US)

(72) Inventors: Eric Burdette, Reddick, FL (US); Paul A. David, Bow, NH (US); Christine M. Graham, Bow, NH (US); Seth Prentice, Epping, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/596,514

(22) Filed: May 16, 2017

(65) Prior Publication Data

US 2017/0336225 A1 Nov. 23, 2017

Related U.S. Application Data

(60) Provisional application No. 62/337,478, filed on May 17, 2016.

(51) Int. Cl.
| | |
|---|---|
| *G01P 3/48* | (2006.01) |
| *G01P 3/52* | (2006.01) |
| *G01P 13/00* | (2006.01) |
| *G01B 7/14* | (2006.01) |
| *G01B 7/30* | (2006.01) |
| *G01D 5/14* | (2006.01) |

(Continued)

(52) U.S. Cl.
CPC ............... *G01D 5/14* (2013.01); *G01P 3/487* (2013.01)

(58) Field of Classification Search
CPC .. G01P 3/48; G01P 3/487; G01P 3/489; G01P 3/52; G01P 13/00; G01B 7/14; G01B 7/30; G01D 5/14; H03M 1/22
See application file for complete search history.

(56) References Cited

U.S. PATENT DOCUMENTS

| | | |
|---|---|---|
| 3,304,434 A | 2/1967 | Koster |
| 4,225,939 A | 9/1980 | Yashiro |

(Continued)

FOREIGN PATENT DOCUMENTS

| | | |
|---|---|---|
| CN | 204 989 435 U | 1/2016 |
| DE | 2518054 A1 | 11/1976 |

(Continued)

OTHER PUBLICATIONS

Communication pursuant to Rules 161(1) and 162 EPC dated Sep. 5, 2018 for Application No. 17702179.7; 3 Pages.

(Continued)

*Primary Examiner* — Neel D Shah
(74) *Attorney, Agent, or Firm* — Daly, Crowley, Mofford & Durkee, LLP

(57) ABSTRACT

An apparatus and a method provide an output signal indicative of a speed of rotation and/or a direction of movement of a ferromagnetic object having ferromagnetic features and capable of moving. A variety of signal formats of the output signal are described, each of which have pulses at a rate faster than the ferromagnetic features pass by the magnetic field sensor.

33 Claims, 19 Drawing Sheets

(51) Int. Cl.
*H03M 1/22* (2006.01)
*G01P 3/487* (2006.01)

(56) References Cited

U.S. PATENT DOCUMENTS

| | | | |
|---|---|---|---|
| 4,283,679 A | 8/1981 | Ito et al. | |
| 4,513,403 A | 4/1985 | Troy | |
| 4,642,555 A | 2/1987 | Swartz et al. | |
| 4,649,796 A | 3/1987 | Schmidt | |
| 4,893,027 A | 1/1990 | Kammerer et al. | |
| 5,019,773 A | 5/1991 | Sugiura et al. | |
| 5,138,640 A | 8/1992 | Fleck et al. | |
| 5,244,834 A | 9/1993 | Suzuki et al. | |
| 5,332,956 A | 7/1994 | Oh | |
| 5,442,313 A | 8/1995 | Santos et al. | |
| 5,486,759 A | 1/1996 | Seiler et al. | |
| 5,696,790 A | 12/1997 | Graham et al. | |
| 5,761,206 A | 6/1998 | Kackman | |
| 5,781,005 A | 7/1998 | Vig et al. | |
| 5,917,320 A | 6/1999 | Scheller et al. | |
| 6,091,239 A | 7/2000 | Vig et al. | |
| 6,242,604 B1 | 6/2001 | Hudlicky et al. | |
| 6,242,904 B1* | 6/2001 | Shirai | G01D 5/2451 |
| | | | 324/165 |
| 6,242,905 B1 | 6/2001 | Draxelmayr | |
| 6,242,908 B1 | 6/2001 | Scheller et al. | |
| 6,278,269 B1 | 8/2001 | Vig et al. | |
| 6,288,567 B1 | 9/2001 | Fink | |
| 6,297,627 B1 | 10/2001 | Towne et al. | |
| 6,339,322 B1 | 1/2002 | Loreck et al. | |
| 6,492,804 B2 | 12/2002 | Tsuge et al. | |
| 6,525,531 B2 | 2/2003 | Forrest et al. | |
| 6,542,847 B1 | 4/2003 | Lohberg et al. | |
| 6,590,384 B1 | 7/2003 | Draxelmayr | |
| 6,653,968 B1 | 11/2003 | Schneider | |
| 6,687,644 B1 | 2/2004 | Zinke et al. | |
| 6,693,419 B2 | 2/2004 | Stauth et al. | |
| 6,788,221 B1 | 9/2004 | Ely et al. | |
| 6,815,944 B2 | 11/2004 | Vig et al. | |
| 6,822,588 B1 | 11/2004 | Marshall, Jr. et al. | |
| 6,968,484 B2 | 11/2005 | Hummel | |
| 7,026,808 B2 | 4/2006 | Vig et al. | |
| 7,184,876 B2 | 2/2007 | Teulings et al. | |
| 7,199,579 B2 | 4/2007 | Scheller et al. | |
| 7,295,000 B2 | 11/2007 | Werth | |
| 7,319,418 B2 | 1/2008 | Fink | |
| 7,340,969 B2 | 3/2008 | Hara et al. | |
| 7,345,468 B2 | 3/2008 | Okada et al. | |
| 7,362,094 B2 | 4/2008 | Voisine et al. | |
| 7,365,530 B2 | 4/2008 | Bailey et al. | |
| 7,466,123 B2 | 12/2008 | Kato et al. | |
| 7,592,801 B2 | 9/2009 | Bailey et al. | |
| 7,662,470 B2 | 2/2010 | Costa | |
| 7,772,838 B2 | 8/2010 | Bailey et al. | |
| 7,800,389 B2 | 9/2010 | Friedrich et al. | |
| 7,830,278 B2 | 11/2010 | Lohberg et al. | |
| 7,923,996 B2 | 4/2011 | Doogue et al. | |
| 8,030,918 B2 | 10/2011 | Doogue et al. | |
| 8,577,634 B2 | 11/2013 | Donovan et al. | |
| 8,624,588 B2 | 1/2014 | Vig et al. | |
| 8,680,846 B2 | 3/2014 | Cesaretti et al. | |
| 8,754,640 B2 | 6/2014 | Vig et al. | |
| 8,860,404 B2 | 10/2014 | Dwyer et al. | |
| 8,994,369 B2 | 3/2015 | Vig et al. | |
| 9,068,859 B2 | 6/2015 | Dwyer et al. | |
| 9,076,272 B2 | 7/2015 | Hammerschmidt | |
| 9,151,771 B2 | 10/2015 | Vig et al. | |
| 9,222,990 B2 | 12/2015 | Dwyer et al. | |
| 2001/0002791 A1 | 6/2001 | Tsuge et al. | |
| 2001/0009367 A1 | 7/2001 | Seitzer et al. | |
| 2002/0027488 A1 | 3/2002 | Hayat-Daoodi et al. | |
| 2003/0001563 A1* | 1/2003 | Turner | G01D 5/145 |
| | | | 324/165 |
| 2004/0062362 A1 | 4/2004 | Matsuya | |
| 2004/0135220 A1 | 7/2004 | Goto | |
| 2005/0120782 A1 | 6/2005 | Kishibata et al. | |
| 2005/0179429 A1 | 8/2005 | Lohberg | |
| 2005/0225318 A1 | 10/2005 | Bailey et al. | |
| 2006/0136171 A1 | 6/2006 | Kaster et al. | |
| 2007/0139036 A1 | 6/2007 | Kondo | |
| 2009/0058404 A1 | 3/2009 | Kurumado | |
| 2009/0153137 A1 | 6/2009 | Bailey et al. | |
| 2009/0207923 A1 | 8/2009 | Dress | |
| 2009/0251134 A1 | 10/2009 | Uenoyama | |
| 2009/0284256 A1 | 11/2009 | Butzmann | |
| 2010/0026279 A1* | 2/2010 | Vig | G01P 3/488 |
| | | | 324/173 |
| 2010/0211347 A1 | 8/2010 | Friedrich et al. | |
| 2011/0018533 A1 | 1/2011 | Cesaretti et al. | |
| 2012/0116664 A1 | 5/2012 | Shibata | |
| 2013/0214774 A1 | 8/2013 | Cesaretti et al. | |
| 2013/0335067 A1 | 12/2013 | Dwyer et al. | |
| 2013/0335074 A1 | 12/2013 | Dwyer et al. | |
| 2014/0347045 A1 | 11/2014 | Paul et al. | |
| 2015/0061656 A1* | 3/2015 | Fernandez | G01B 7/003 |
| | | | 324/207.25 |
| 2015/0263659 A1 | 9/2015 | Chi | |
| 2015/0268263 A1 | 9/2015 | Rasbornig | |
| 2016/0011010 A1 | 1/2016 | Muthers | |

FOREIGN PATENT DOCUMENTS

| | | |
|---|---|---|
| DE | 3535842 A1 | 4/1987 |
| DE | 4031560 A1 | 4/1992 |
| DE | 19634715 A1 | 3/1998 |
| DE | 19650935 A1 | 6/1998 |
| DE | 19838433 A1 | 3/1999 |
| DE | 19911774 A1 | 12/1999 |
| DE | 19961504 A1 | 6/2001 |
| DE | 19634714 B4 | 8/2007 |
| EP | 1 580 560 A1 | 9/2005 |
| EP | 1600741 A2 | 11/2005 |
| EP | 1600741 A3 | 5/2006 |
| EP | 1662353 A1 | 5/2006 |
| GB | 2018538 | 10/1979 |
| JP | 63-300911 | 12/1988 |
| JP | H2-116753 | 5/1990 |
| JP | 02-149013 | 6/1990 |
| JP | H03-29817 | 2/1991 |
| JP | H06-273437 | 9/1994 |
| JP | 07-012582 | 1/1995 |
| JP | 10332725 | 12/1998 |
| JP | 11-64363 | 3/1999 |
| JP | 2001-043475 | 2/2001 |
| JP | 2001-505691 | 4/2001 |
| JP | 20011695951 | 6/2001 |
| JP | 2002117500 | 4/2002 |
| JP | 2002357920 | 12/2002 |
| JP | 4093381 | 6/2008 |
| JP | 4142109 | 8/2008 |
| WO | WO 88/09026 | 11/1988 |
| WO | WO 9825148 A2 | 6/1998 |
| WO | WO 9949322 A1 | 9/1999 |
| WO | WO 01/74139 A2 | 10/2001 |
| WO | WO 01/74139 A3 | 10/2001 |
| WO | WO 2008/145662 A1 | 12/2008 |
| WO | WO 2010/014309 A1 | 2/2010 |

OTHER PUBLICATIONS

Shardul Amarchand Mangaldas Letter dated Jan. 16, 2018 for IN Pat. Appl. No. 188/KOLNP/2011; 3 pages.
First Examination Report dated Dec. 13, 2017 for IN Pat. Appl. No. 186/KOLNP/2011; 5 pages.
U.S. Appl. No. 15/010,453, filed Jan. 19, 2016, Prentice et al.
Allegro Microsystems, Inc. Data Sheet A1341; "High Precision, Highly Programmable Linear Hall Effect Sensor IC with EEPROM, Output Protocols SENT and PWM, and Advanced Output Linearization Capabilities;" May 17, 2010; 46 pages.
Allegro Microsystems, Inc. Data Sheet ATS601LSG; "Non-TPOS, Tooth Detecting Speed Sensor;" Nov. 1, 2011; 9 pages.

(56) References Cited

OTHER PUBLICATIONS

Infineon Technologies; "Differential Two-Wire Hall Effect Sensor IC;" TLE4942 Preliminary Data Sheet; Jun. 2000; 13 pages.
Jeffrey et al.; "Sensor Testing Through Bias Superposition;" Science Direct, Sensors and Actuators, A 136; Feb. 6, 2007, pp. 441-455 from article; 15 pages.
Lequesne et al.; "High-Accuracy Magnetic Position Encoder Concept;" IEEE Transactions on Industry Applications; vol. 35, No. 3; May/Jun. 1999; 9 pages.
Robert Bosch GMBH Stuttgart; "Active Sensor for ABS/ASR/VDC-Systems with 2-Wire-Current Interface;" Specification TLE4941/TLE4942; Version 5; Jun. 25, 2000; 44 pages.
CN $2^{nd}$ Office Action dated Jan. 18, 2013; for CN Pat. App. No. 200980129766.7; 5 pages.
CN Notice of Completing Formalities dated Mar. 6, 2013; for Chines Pat. App. No. 200980129766.7; 4 pages.
Email from $21^{st}$ Century Patent and Law Firm re: Notice to Submit a Response dated Apr. 20, 2015; Korean Pat. App. No. 10-2011-7002041; including 2 U.S. Patent References (U.S.Pat. 2003/0001563 and U.S. Pat. No. 6,242,904 B1); 16 pages.
Email dated Jun. 11, 2012 for CN Office Action dated May 3, 2012; for CN Pat. App. No. 200980129766.7; 9 pages.
Email from $21^{st}$ Century Patent and Law Firm dated Apr. 21, 2015 attaching two U.S. Patent References for Korean Pat. App. No. 10-2011-7002041; 2 pages.
EP Office Communication dated Oct. 2, 2014; for European Patent Appl. No. 09 789 890.2; 5 pages.
EP Response to official communication filed Apr. 18, 2011 to PCT Written Opinion dated Aug. 25, 2009 for EP Patent Appl. No. 09789890.2; 11 pages.
Final Office Action dated Jul. 23, 2013; for U.S. Appl. No. 12/183,367; 8 pages.
Final Office Action dated Jul. 1, 2013; for U.S. Appl. No. 12/183,367; 7 pages.
Final Office Action dated May 2, 2013; for U.S. Appl. No. 12/183,367; 8 pages.
Invitation to Pay Additional Fees with Partial Search Report dated Apr. 13, 2017 for International Application No. PCT/US2017/012241; 7 Pages.
Letter to NTD Patent and Trademark Agency Limited dated Feb. 6, 2013; for Chinese Pat. App. No. 200980129766.7; 2 pages.
Letter to NTD Patent and Trademark Agency Limited dated Aug. 29, 2012 in response to CN Office Action dated May 3, 2012 for Chinese Pat. App. No. 2009-80129766.7; 37 pages.
Notice of Allowance dated Dec. 5, 2014 for U.S. Appl. No. 14/093,815; 9 pages.
Notice of Allowance dated Sep. 6, 2013; for U.S. Appl. No. 12/183,367; 7 pages.
Office Action dated Sep. 25, 2014 corresponding to U.S. Appl. No. 14/093,815; 15 Pages.
Office Action dated Sep. 25, 2014 corresponding to U.S. Appl. No. 14/093,787; 14 Pages.
Office Action dated Jul. 1, 2013 for U.S. Appl. No. 12/183,367; 7 pages.
Office Action dated May 2, 2013 for U.S. Appl. No. 12/183,367; 15 pages.
Office Action/Restriction Requirement dated Apr. 12, 2012; for U.S. Appl. No. 12/183,367; 6 pages.
Office Action dated Oct. 20, 2011; for U.S. Appl. No. 12/183,367; 9 pages.
Office Action dated May 12, 2011; for U.S. Appl. No. 12/183,367; 17 pages.
PCT International Preliminary Report on Patentability for PCT/US2009/048237 dated Feb. 1, 2011; 8 pages.
PCT Search Report and Written Opinion of the ISA for PCT/US2009/048237 dated Aug. 25, 2009; 13 pages.
PCT Invitation to Pay Additional Fees for PCT Pat Appl. No. PCT/US/2017/012241 dated Apr. 13, 2017; 7 pages.
Response to Office Action dated Sep. 25, 2014; filed on Nov. 13, 2014 for U.S. Appl. No. 14/093,815; 7 Pages.
Response to Final Office Action dated Jul. 23, 2013; filed Aug. 27, 2013; for U.S. Appl. No. 12/183,367; 12 pages.
Response to Final Office Action dated May 2, 2013; filed Jun. 19, 2013; for U.S. Appl. No. 12/183,367; 8 pages.
Response to Office Action/Restriction Requirement dated Apr. 12, 2012; filed Feb. 11, 2013; for U.S. Appl. No. 12/183,367; 2 pages.
Response to Office Action dated Oct. 20, 2011; filed Jan. 17, 2012; for U.S. Appl. No. 12/183,367; 15 pages.
Response to Office Action dated May 12, 2011; filed Aug. 10, 2011; for U.S. Appl. No. 12/183,367; 13 pages.
PCT Search Report and Written Opinion dated Nov. 7, 2017 for PCT Appl. No. PCT/US2017/032840; 24 pages.
PCT International Preliminary Report dated Aug. 9, 2018 for International Application No. PCT/US2017/012241; 17 Pages.
PCT Partial Search Report and Written Opinion for PCT Appl. No. PCT/US2017/032840 dated Aug. 9, 2017; 16 pages.
Response dated Mar. 4, 2019 for European Application No. 17702179.7; 20 Pages.
U.S. Non-Final Office Action dated Oct. 2, 2018, for U.S. Appl. No. 15/010,453; 13 Pages.
U.S. Final Office Action dated Mar. 28, 2019 for U.S. Appl. No. 15/010,453; 19 Pages.
Response to Office Action dated Oct. 2, 2018 for U.S. Appl. No. 15/010,453, as filed on Dec. 14, 2018; 14 Pages.
U.S. Notice of Allowance dated Sep. 9, 2019 for U.S. Appl. No. 15/010,453; 16 Pages.
Written Submissions Submitted Further to the Official Hearing on Jul. 23, 2019 for India Application No. 186/KOLNP/2011; Written Submissions filed on Aug. 6, 2019; 30 Pages.
Response to U.S. Final Office Action dated Mar. 28, 2019 for U.S. Appl. No. 15/010,453; Response filed Jun. 27, 2019; 14 Pages.

* cited by examiner

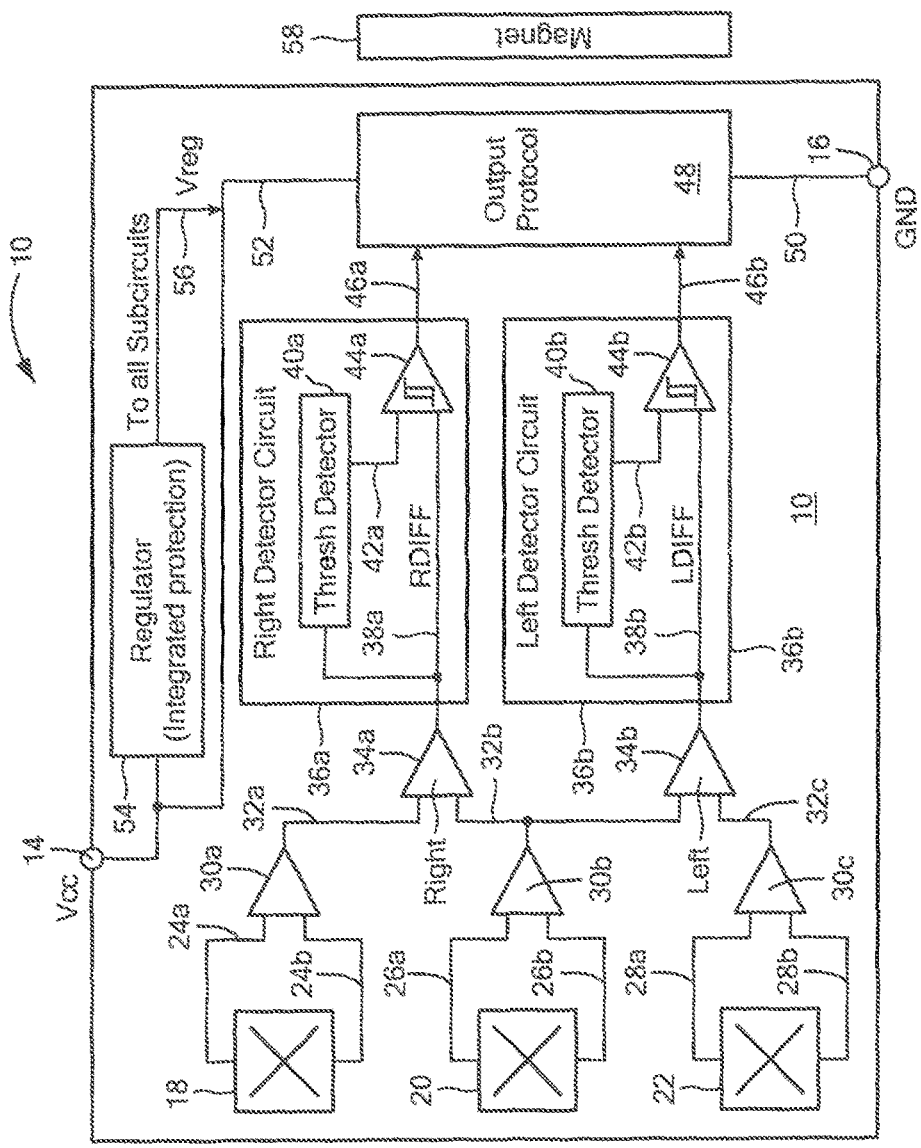
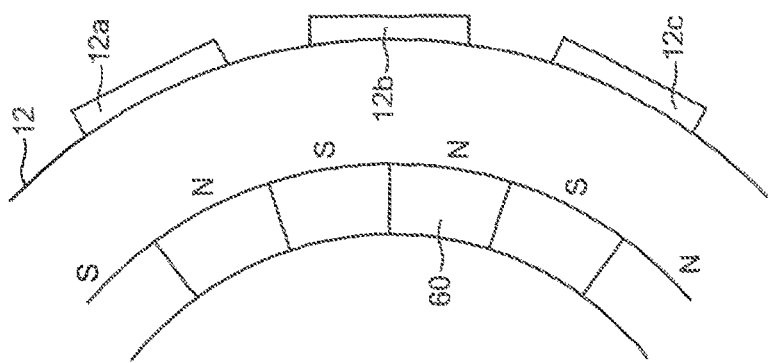
FIG. 1

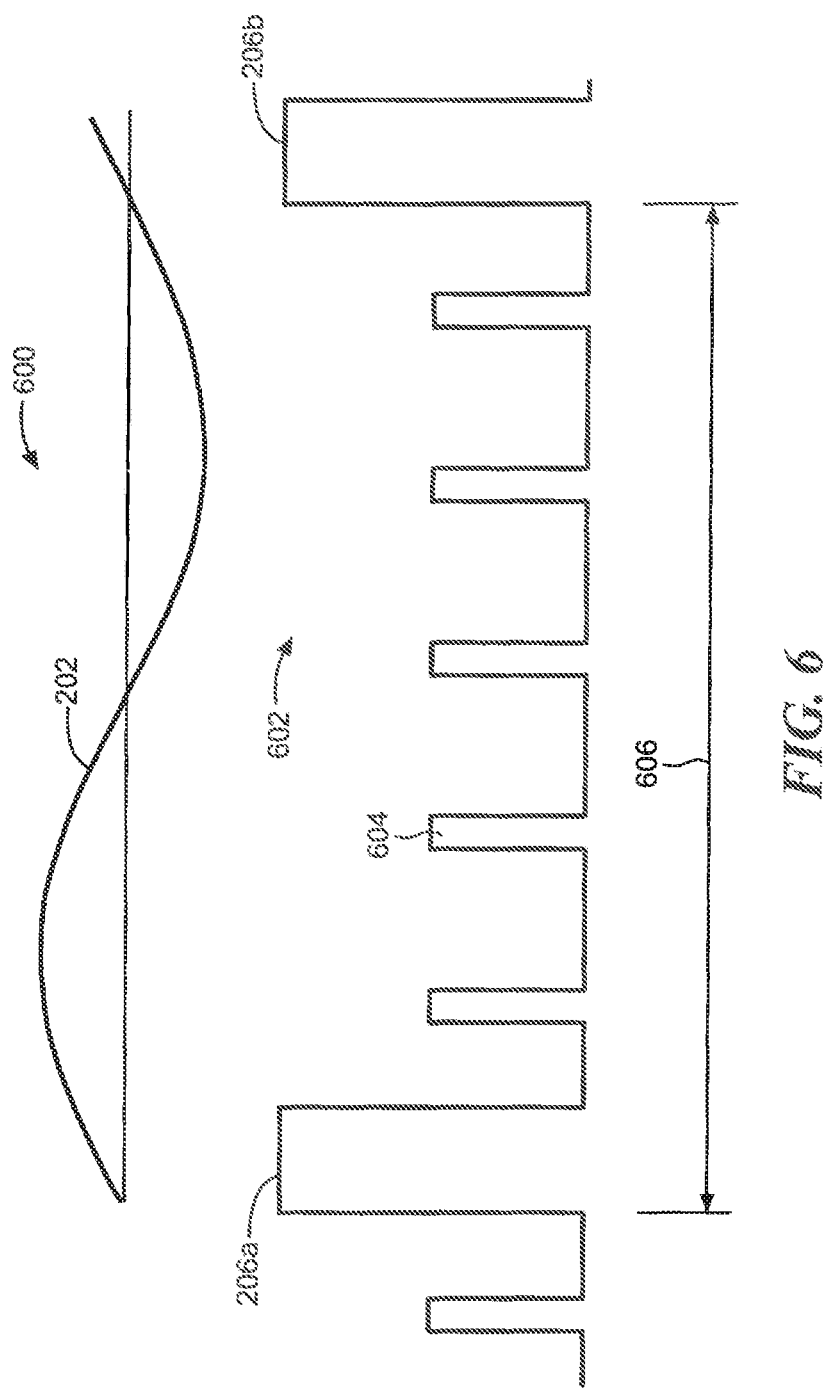

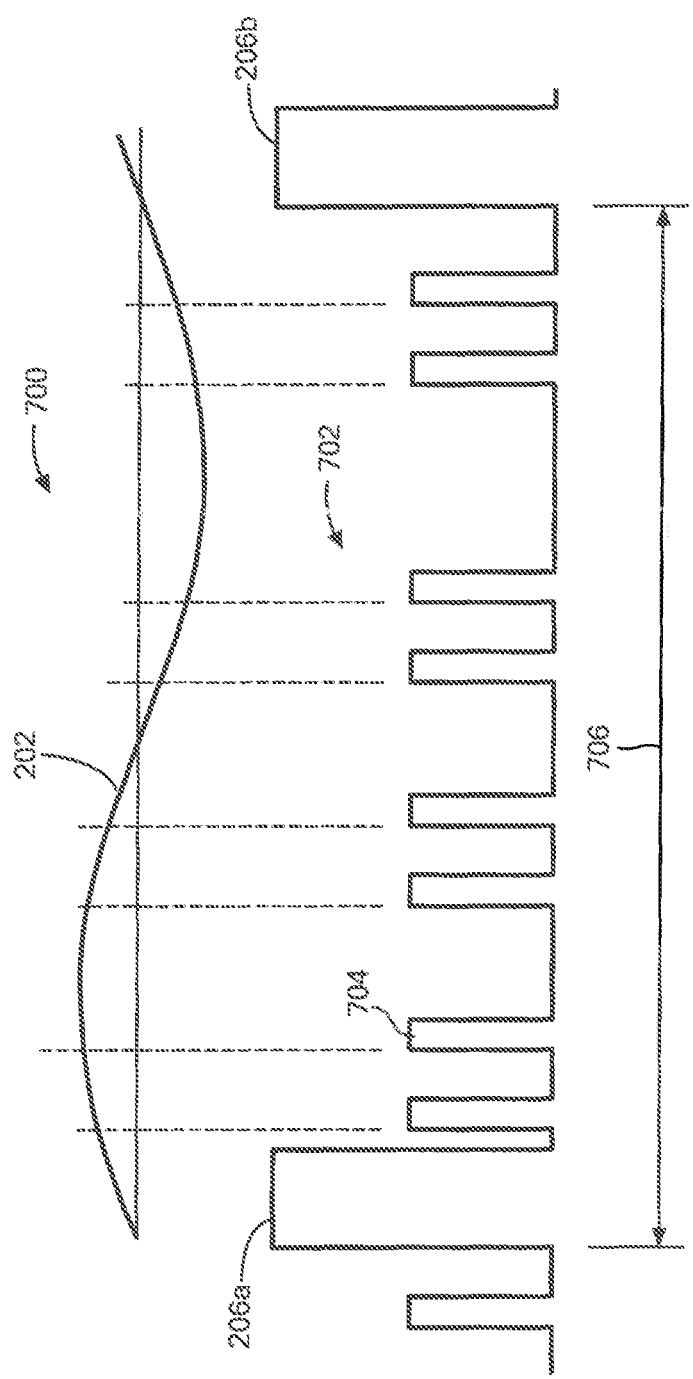

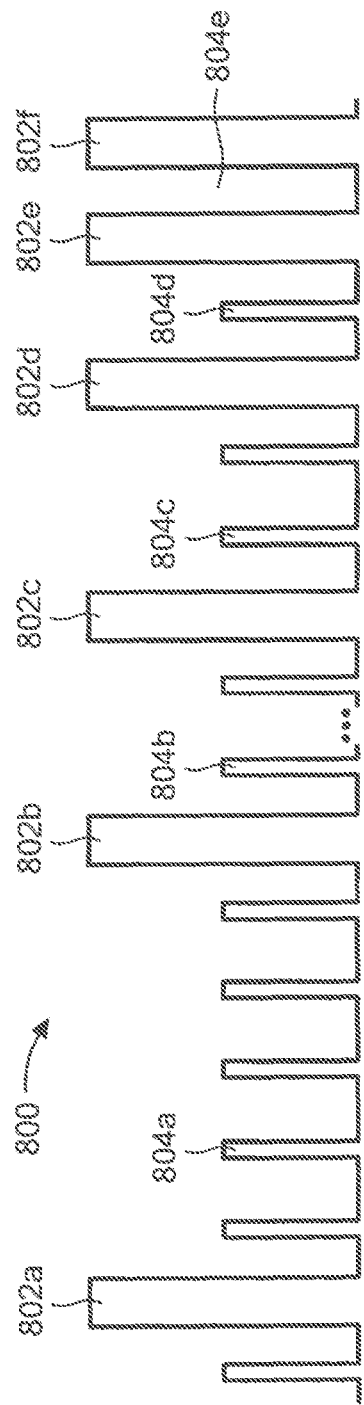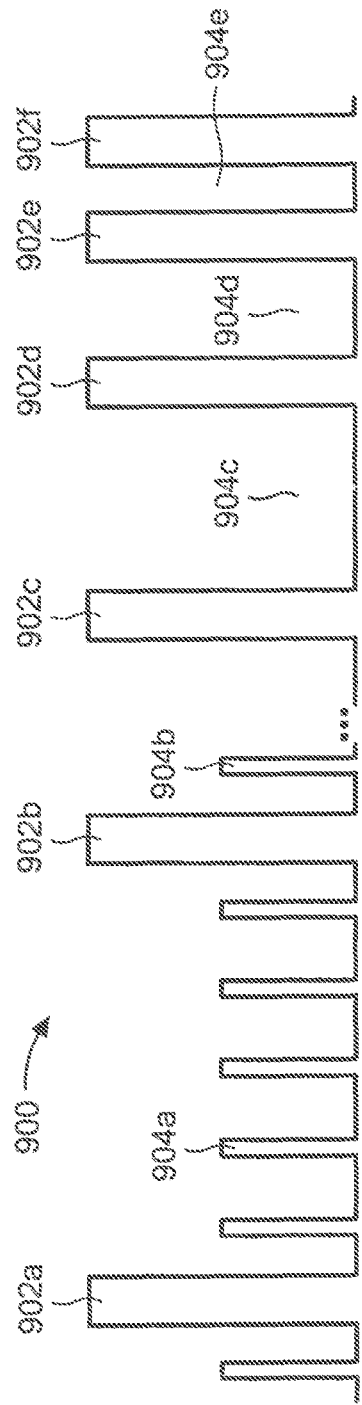

MAGNETIC FIELD SENSORS AND OUTPUT SIGNAL FORMATS FOR A MAGNETIC FIELD SENSOR

CROSS REFERENCE TO RELATED APPLICATIONS

This application claims the benefit under 35 U.S.C., § 119(e) of U.S. Provisional Application No. 62/337,478 filed May 17, 2016, which application is incorporated herein by reference in its entirety.

STATEMENT REGARDING FEDERALLY SPONSORED RESEARCH

Not Applicable,

FIELD OF THE INVENTION

This invention relates generally to integrated circuits and, more particularly, to magnetic field sensors for detecting and communicating a speed of rotation and/or a direction of rotation of a ferromagnetic object.

BACKGROUND OF THE INVENTION

Proximity detectors for detecting ferromagnetic objects are known. In proximity detectors, the magnetic field associated with the ferromagnetic object is detected by a magnetic field sensing element, such as a Hall effect element or a magnetoresistance element, which provides a signal (i.e., a magnetic field signal or sensing element signal) proportional to a detected magnetic field.

Some types of magnetic field sensors, i.e. proximity detectors, merely provide an output signal representative of the proximity of the ferromagnetic object. However, other types of magnetic, field sensors, i.e., rotation detectors, provide an output signal representative of the approach and retreat of each tooth of a rotating ferromagnetic gear or of each segment of a segmented ring magnet having segments with alternating polarity as the gear or ring magnet rotates. The rotation detector processes the magnetic field signal to generate an output signal that changes state each time the magnetic field signal either reaches a value near to a peak (positive or negative peak) or crosses a threshold level. Therefore, the output signal, which has an edge rate or period, is indicative of a rotation and a speed of rotation of the ferromagnetic gear or of the ring magnet.

One type of rotation detector can compare a sinusoidal sensing element signal to a threshold. In some types of rotation detectors, a peak-to-peak percentage detector (or threshold detector) generates at least one threshold level that is equal to a percentage of the peak-to-peak magnetic field signal detected by one or more magnetic field sensing elements. For this type of rotation detector, the output signal changes state when the magnetic field signal crosses the at least one threshold level. One such threshold detector is described in U.S. Pat. No. 5,917,320 entitled "Detection of Passing Magnetic Articles While Periodically Adapting Detection Threshold" assigned to the assignee of the present invention and incorporated herein by reference.

In another type of rotation detector, a slope-activated detector, also referred to as a peak-referenced detector (or peak detector), threshold levels are identified that differ from the positive and negative peaks (i.e., the peaks and valleys) of the sensing element signal by a predetermined amount. Thus, in this type of rotation detector, the output signal changes state when the magnetic field signal departs from a peak and/or valley by the predetermined amount. One such peak detector is described in U.S. Pat. No. 6,091,239 entitled "Detection Of Passing Magnetic Articles With a Peak Referenced Threshold Detector," which is assigned to the assignee of the present invention and incorporated herein by reference, Another such peak detector is described in U.S. Pat. No. 6,693,419, entitled "Proximity Detector," which is assigned to the assignee of the present invention and incorporated herein by reference. Another such peak detector is described in U.S. Pat. No. 7,199,579, entitled "Proximity Detector," which is assigned to the assignee of the present invention and incorporated herein by reference.

It should be understood that, because the above-described peak-to-peak percentage detector (threshold detector) and the above-described peak-referenced detector (peak detector) both have circuitry that can identify the positive and negative peaks of a magnetic field the peak-to-peak percentage detector and the peak-referenced detector both include a peak detector circuit configured to detect a positive peak and a negative peak of the magnetic field signal. Each, however, uses the detected peaks in different ways.

In order to accurately detect the positive and negative peaks of a magnetic field signal, some rotation detectors are capable of tracking at least part of the sensing element signal (magnetic field signal). To this end, typically, one or more digital-to-analog converters (PACs) can be used to generate a tracking signal, which tracks the magnetic field signal. For example, in the above-referenced U.S. Pat. Nos. 5,917,320 and 6,091,239, two DACs are used, one (PDAC) to detect the positive peaks of the magnetic field signal and the other (NDAC) to detect the negative peaks of the magnetic field signal.

As described above, an output signal generated by a conventional proximity detector used to detect a rotation of a ferromagnetic object (e.g., a ring magnet or a ferromagnetic gear) can have a format indicative of the rotation and of the speed of rotation of the ferromagnetic object or ring magnet. For example, the conventional proximity detector can generate the output signal as a two-state binary signal having a frequency indicative of the speed of rotation. In some arrangements, the output signal can be comprised of voltage or current pulses, a rate of which is representative of speed of rotation, and a puke width of which is indicative of direction of rotation. This arrangement is described, for example, in U.S. patent application No. 6,815,944, issued Nov. 9, 2004, assigned to the assignee of the present invention, and incorporated by reference herein in its entirety.

In conventional rotation detectors, the above-described pulses are generated at a rate that features on a ferromagnetic object pass by the proximity detector. A variety of types and shapes of ferromagnetic objects can be used.

In some arrangements, the ferromagnetic object is a gear like object having gear teeth and the magnetic field sensor, e.g., rotation detector, is a back-biased magnetic field sensor, which includes a magnet to generate a magnetic field proximate to the magnetic field sensor. Gear teeth passing by the magnetic field sensor cause changes in the strength and angle of the magnetic field, and thus, the passing gear teeth can be sensed and the above-described pulses can be generated with a rate at which the gear teeth pass by.

In other arrangements, the ferromagnetic object is a ring magnet having one or more north-south pole pairs. These arrangements do not need the back-biased arrangement and the north-south pole pairs passing by the proximity detector can be sensed and the above-described pulses can be generated with a rate at which the north-south pole pairs pass by the magnetic field sensor.

In both of the above arrangement, it should be apparent that there is no information provided by the magnetic field sensor, e.g. rotation detector, between the pulses. However, there are applications for which it is desirable that the magnetic field sensor provides a higher resolution of angular accuracy of the ferromagnetic object.

For example, an automobile can have an automatic parking assist function that can use the ABS (automatic braking system) components to detect a rotational speed of a wheel. The automatic parking assist operates at very low wheel speeds, and thus, it is desirable to identify a wheel rotation position with a higher resolution than is typically provided by the ABS system.

SUMMARY OF THE INVENTION

The present invention can provide a proximity detector (rotation detector) that provides a higher resolution of angular accuracy of a moving or rotating ferromagnetic object. Some embodiments can provide angular information between pulses in the output signal of the conventional proximity detector (rotation detector).

In accordance with an example useful for understanding an aspect of the present invention, a magnetic field sensor includes one or more magnetic field sensing elements operable to generate a respective one or more magnetic field signals proportional to a magnetic field associated with a ferromagnetic object capable of moving, the ferromagnetic object having ferromagnetic features, wherein each magnetic field signal has a plurality of magnetic field signal periods as the ferromagnetic object moves. The magnetic field sensor can also include one or more circuit channels coupled to receive the one or more magnetic field signals, the one or more circuit channels configured to generate a respective one or more channel signals. The magnetic field sensor can also include an electronic circuit coupled to the one or more channel signals and operable to generate a first output signal comprising a plurality of signal pulses having a plurality of state transitions, the plurality of signal pulses representative of at least a rate of movement of the ferromagnetic object, wherein the plurality of signal pulses occurs within each one of the plurality of magnetic field signal periods, wherein the plurality of state transitions comprises at least four state transitions.

In accordance with another example useful for understanding another aspect of the present invention, a method used in a magnetic field sensor, includes generating, with one or more magnetic field sensing elements, a respective one or more magnetic field signals proportional to a magnetic field associated with a ferromagnetic object capable of moving, the ferromagnetic object having ferromagnetic features, wherein each magnetic field signal has a plurality of magnetic field signal periods as the ferromagnetic object moves. The method can further include generating one or more channel signals with, a respective one or more circuit channels coupled to receive the one or more magnetic field signals. The method can further includes generating, with an electronic circuit coupled to the one or more circuit channels, a first output signal comprising a plurality of signal pulses having a plurality of state transitions, the plurality of signal pulses representative of at least a rate of movement of the ferromagnetic object, wherein the plurality of signal pulses occurs within each one of the plurality of magnetic field signal periods, wherein the plurality of state transitions comprises at least four state transitions.

In accordance with another example useful for understanding another aspect of the present invention, a magnetic field sensor includes means for generating, with one or more magnetic field sensing elements, a respective one or more magnetic field signals proportional to a magnetic field associated with a ferromagnetic object capable of moving, the ferromagnetic object having ferromagnetic features, wherein each magnetic field signal has a plurality of magnetic field signal periods as the ferromagnetic object moves. The magnetic field sensor can further include means for generating one or more channel signals with a respective one or more circuit channels coupled to receive the one or more magnetic field signals. The magnetic field sensor can further include means for generating, with an electronic circuit coupled to the one or more circuit channels, a first output signal comprising a plurality of signal pulses having a plurality of state transitions, the plurality of signal pulses representative of at least a rate of movement of the ferromagnetic object, wherein the plurality of signal pulses occurs within each one of the plurality of magnetic field signal periods, wherein the plurality of state transitions comprises at least four state transitions.

BRIEF DESCRIPTION OF THE DRAWINGS

FIGS. 1 is a block diagram of a magnetic field sensor for generating one or more magnetic field signals and for generating an output signal indicative of a speed and/or a direction of a rotation of a ferromagnetic object;

FIG. 6 is a graph showing a magnetic field signal and another example of a corresponding output signal indicative of a speed and/or a direction of a rotation of a ferromagnetic object;

FIG. 7 is a graph showing a magnetic field signal and another example of a corresponding output signal indicative of a speed and/or a direction of a rotation of a ferromagnetic object;

FIG. 8 is a graph showing another example of a corresponding output signal indicative of a speed and/or a direction of a rotation of a ferromagnetic object;

FIG. 9 is a graph showing another example of a corresponding output signal indicative of a speed and/or a direction of a rotation of a ferromagnetic object;

DETAILED DESCRIPTION OF THE INVENTION

Figure 1A:
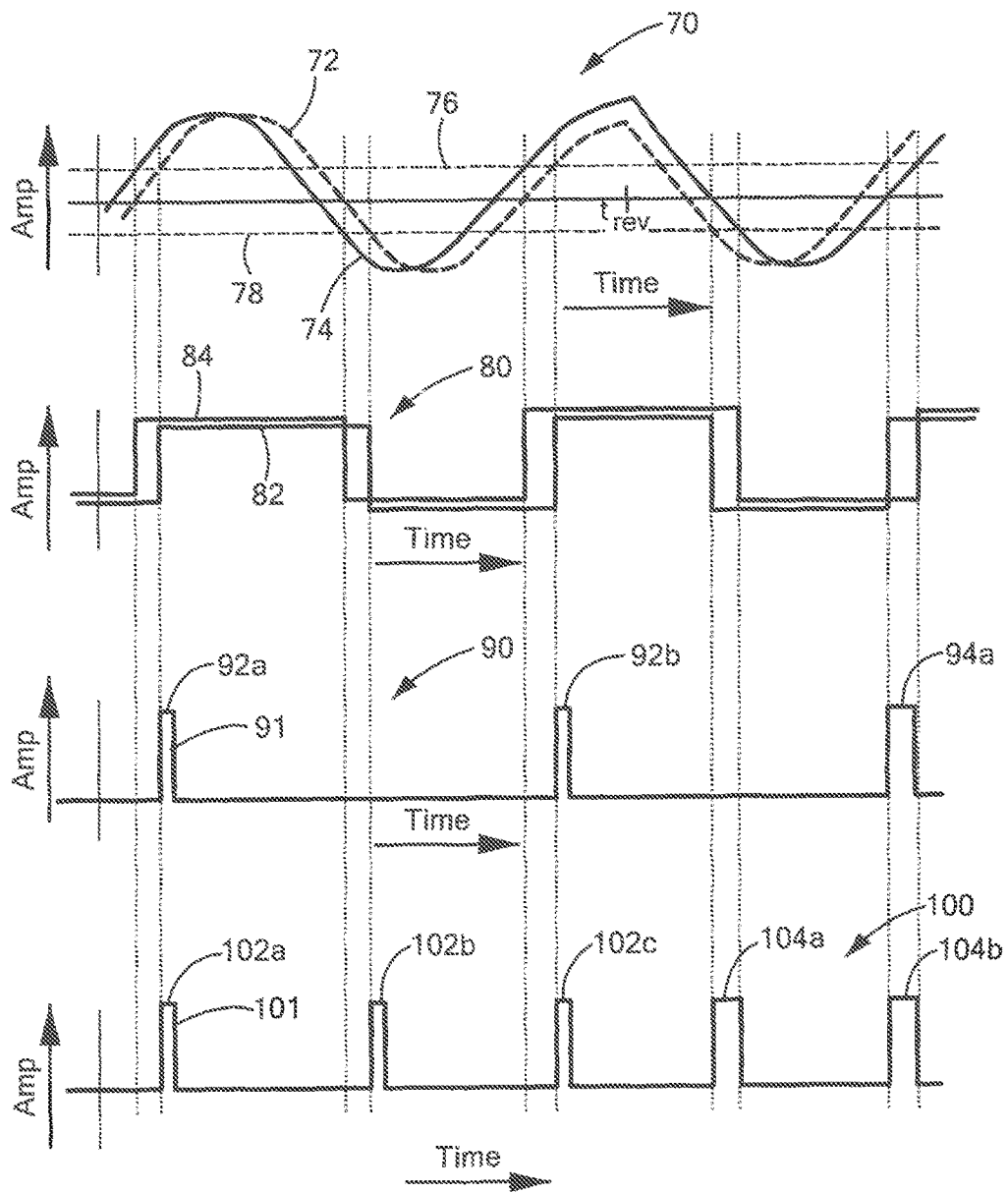
FIG. 1A is a set of graphs showing magnetic field signals, intermediate signals, and speed pulses, which can be output signals from the magnetic field sensor of FIG. 1.

Before describing the present invention, some introductory concepts and terminology are explained. As used herein, the term "rotation detector" is used to describe a circuit that includes at least one "magnetic field sensing element," which detects a magnetic field. The rotation detector can sense movement, e.g., rotation, of a ferromagnetic object, for example, advance and retreat of magnetic domains of a ring magnet or advance and retreat of gear teeth of a ferromagnetic gear.

Similarly, the term "movement detector" can be used to describe either a rotation detector or used to describe a magnetic field sensor that can sense different movement, e.g., linear movement, of a ferromagnetic object, for example, linear movement of magnetic domains of a ring magnet or linear movement of gear teeth of a ferromagnetic gear.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical all elements tend to have axes of sensitivity parallel to a substrate.

As used herein, the term "magnetic field sensor" is used to describe a circuit that uses one or more magnetic field sensing elements, generally in combination with other circuits. The magnetic field sensor can be, for example, a rotation detector, a movement detector, a current sensor, or a proximity detector.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector (or movement detector) that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within ±ten degrees.

As used herein, the term "baseline" and the phrase "baseline level" are used to describe a lowest magnitude (which may be near zero or may be some other magnetic field) of a magnetic field experienced by a magnetic field sensing element within a magnetic field sensor when the magnetic field sensor is operating in a system.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

In particular, it should be understood that a so-called "comparator" can be comprised of an analog comparator having a two state output signal indicative of an input signal being above or below a threshold level (or indicative of one input signal being above or below another input signal). However the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the terms "line" and "linear" are used to describe either a straight line or a curved line. The line can be described by a function having any order less than infinite.

Ferromagnetic objects described herein can have a variety of forms, including, but not limited to, a ring magnet having one or more pole pair, and a gear having two or more gear teeth.

Signals with pulses are described herein as generated by a magnetic field sensor. In some embodiments, the signals are provided on a communication link to an external processor, for example, a CPU within an automobile, to further process the pulses.

As used herein, the term "pulse" is used to describe a signal that begins at a first level or state, transitions rapidly to a second level or state different than the first level, and returns rapidly to the first level.

Two channel magnetic field sensors are described below having two circuit channels. In general, the two channel magnetic field sensors can be capable of detecting and communicating both movement speed (e.g., rotation speed) and also motion direction (e.g., rotation direction) of a ferromagnetic object. However, it should be appreciated that a single channel magnetic field sensor can be capable of detecting and communicating movement speed (e.g., rotation speed).

Ferromagnetic gears are used in some examples below to show a rotating ferromagnetic object having ferromagnetic features, i.e., teeth. However, in other embodiments, the gear can be replaced with a ring magnet having at least one pole pair. Also, linear arrangements of ferromagnetic objects are possible that move linearly.

Referring to FIG. 1, an exemplary rotation detector 10 having two channels can be used, for example, to detect passing gear teeth, for example, gear teeth 12*a*-12*c* of a ferromagnetic gear 12. A permanent magnet 58 can be placed at a variety of positions proximate to the gear 12, resulting in fluctuations of a magnetic field proximate to the gear 12 as the gear 12 having the gear teeth 12*a*-12*c* rotates. Use of the above-described magnet results in a so-called "back-bias" arrangement.

In other embodiments, the magnet 58 and the gear 12 can be omitted. Instead, the rotation detector 10 can be used to detect a rotation of a ring magnet 60 having at least one north pole and at least one south pole.

The rotation detector 10 can have a first terminal 14 coupled to a power supply denoted as Vcc. The rotation detector 10 can also have a second terminal 16 coupled to a fixed voltage source, for example, a ground voltage source, denoted as GND. Thus, is some arrangements, the rotation detector 10 is a two terminal device (or two wire device), for which an output signal appears as a signal current at the first terminal 14, superimposed upon the power supply voltage, Vcc. However, in other arrangements, one of ordinary skill in the art will understand that a rotation detector similar to the rotation detector 10 can be a three terminal device (three wire device) that has a third terminal (not shown) at which an output signal can appear as a voltage rather than a current.

The rotation detector 10 can include first, second, and third magnetic field sensing elements 18, 20, 22, respectively, here shown to be Hall effect elements. The first Hall effect element 18 generates a first differential voltage signal 24*a*, 24*b*, the second Hall effect element 20 generates a second differential voltage signal 26*a*, 26*b*, and the third Hall effect element 22 generates a third differential voltage signal 28*a*, 28*b*, each having respective AC signal components in response to the rotating gear 12.

While each one of the Hall effect elements 18, 20, 22 is shown to be a two terminal device, one of ordinary skill in the art will understand that each one of the Hall effect elements 18, 20, 22 is actually a four terminal device and the other two terminals of the Hall effect elements can be coupled to receive and pass respective currents as might be provided, for example, by a current source or by a voltage source (not shown).

The first differential voltage signal 24*a*, 24*b* can be received by a first differential preamplifier 30*a*, the second differential voltage signal 26*a*, 26*b* can be received by a second differential preamplifier 30*b*, and the third differential voltage signal 28*a*, 28*b* can be received by a third differential preamplifier 30*c*.

First and second amplified signals 32*a*, 32*b* generated by the first and second differential preamplifiers 30*a*, 30*b*, respectively, are received by a "right" channel amplifier 34*a* and the second amplified signal 32*b* and a third amplified signal 32*c* generated by the second and third differential preamplifiers 30*b*, 30*c*, respectively, are received by a "left" channel amplifier 34*b*. Designations of "right" and "left" are arbitrary.

A signal 38*a* generated by the right channel amplifier 34*a* is received by a right channel detector circuit 36*a* and a signal 38*b* generated by the left channel amplifier 34*b* is received by a left channel detector circuit 36*b*. The signals 38*a*, 38*b* can be analog signals, generally sinusoidal in nature.

Taking the right channel detector circuit 36a as representative of both of the detector circuits 36a, 36b, the right channel detector circuit 36a includes a threshold detector circuit 40a coupled to receive the signal 38a. The threshold detector circuit 40a is configured to detect positive and negative peaks of the signal 38a, to identify a peak-to-peak value of the signal 38a, and to generate the threshold signal 42a that, for example, takes on a first threshold at forty percent of the peak-to-peak value of the signal 38a and a second threshold value at sixty percent of the peak-to-peak value of the signal 38a. A comparator 44a is coupled to receive the threshold signal 42a and is also coupled to receive the signal 38a. As a result, the comparator 44a generates a binary, two-state, signal 46a that has transitions when the signal 38a crosses both the first and second thresholds.

A signal 46b generated by the left channel detector circuit 36b is generated in the same way as the signal 46a. However, since the magnetic field sensing elements 18, 20 contribute to the signal 46a, while the magnetic field sensing elements 20, 22 contribute to the signal 46b, it should be appreciated that the signals 46a, 46b have edges that differ in time which its equivalent to phase for a particular signal frequency, i.e., particular rotation speed).

Furthermore, it should be appreciated that a direction of rotation of the gear 12 may be determined from a relative phase or relative time difference (e.g., lag or lead) of a particular edge transition in the signal 46a compared with a particular corresponding edge transition in the signal 46b. Therefore, a relative lag or a lead of edges of the signals 46a, 46b can be used to identify a direction of rotation of the gear 12.

The rotation detector 10 can include an output protocol module 48 coupled to receive and process the signals 46a, 46b and configured to generate an output signal 52, for example, as a current signal, which is indicative of the speed of rotation and the direction of rotation of the gear 12.

Movement speed of the gear 12 can be detected by the output protocol module 48 in accordance with a frequency of the signals 38a, 38b or 46a, 46b. Direction of movement of the gear 12 can be detected in accordance with a relative phase (i.e., sign of a phase) between the signals 38a, 38b or 46a, 46b.

While the rotation detector 10 is shown to include the two detector circuits 36a, 36b, each having a particular topology, it should be understood that any form of peak-referenced detectors (peak detectors) or peak-to-peak percentage detectors (threshold detectors), including, but not limited to, the above-described peak detectors and threshold percentage detectors, can be used in place of or in addition to the detector circuits 36a, 36b.

The output protocol module 48 can be operable to generate output signal formats described in conjunction with figures below.

In some embodiments, the right and left detector circuits 36a, 36b are omitted and the signals 38a, 38b are converted to digital signals and communicated directly to the output protocol module 48.

Referring now to FIG. 1A, graphs 70, 80, 90, 100 have the same horizontal axes with scales in units of time in arbitrary units and vertical axes with scales in units of amplitude in arbitrary units. In the graph 70, signals 72, 74 are indicative of signals 38b, 38c of FIG. 1. Threshold 76 is indicative, for example, of sixty percent of a peak-to-peak value of either one of the signals 72, 74, and threshold 78 is indicative, for example, of forty percent of a peak-to-peak value of either one of the signals 72, 74.

The thresholds 76, 78 can be generated, for example, by one of (or both of) the threshold detectors 40a, 40b. Two thresholds 76, 78 are shown for clarity. However, in some embodiments, each one of the threshold detectors 40a, 40b can generate two respective thresholds, in which case, there can be four thresholds, two thresholds applied to one of the signals 38a and the other two applied to the other signal 38b of FIG. 1.

Shapes of the signals 72, 74 indicate a change of rotation direction of the gear 12 of FIG. 1 at a time trev. Before the time trev, the signal 74 leads the signal 72 in phase. After the time trev, the signal 72 leads the signal 74 in phase.

In the graph 80, signals 82, 84 are examples of signals 46a, 46b of FIG. 1. The signals 82, 84 can be two state signals having transitions with the signals 72, 74 cross thresholds 76, 78. Before the time trev, the signal 84 leads the signal 82 in phase. After the time trev, the signal 82 leads the signal 44 in phase. Thus, a sign of relative phase of the two signals 82, 84, can be used, for example, by the output protocol module 48 of FIG. 1, to identify the direction of rotation of the ferromagnetic gear 12 (or ring magnet 60) of FIG. 1.

In other embodiments, for example, an embodiment like the magnetic field sensor 10 of FIG. 1 but with only one magnetic field sensing element and one circuit channel instead of two, there can be only one sinusoidal signal, e.g., 72, and only one two-state signal, e.g., 82. In this case, there may be no provision to identify direction of rotation of the ferromagnetic gear 12 (or ring magnet 60).

In the graph 90, a signal 91 can be comprised of pulses 92a, 92b, and 94a, an example of a serial signal that can be the same as or similar to the signal 52 of FIG. 1. In time, the pulses 92a, 92b, and 94a can occur proximate to a time of positive or negative transitions of one of the signals 82a, 84b, Thus, the pulses 92a, 92b, 94a occur at each full cycle of the signals 72, 74.

A rate of the pulses 92a, 92b, and 94a can be indicative of a speed of rotation of the ferromagnetic object 12 (or ring magnet 60). Time periods, e.g., respective pulse widths, of the pulses 92a, 92b, and 94a can be indicative of a direction of rotation of the ferromagnetic gear (or ring magnet 60), Thus, before the time trev, the pulses 92a, 92b can be shorter, e.g., forty-file microseconds, and after the time trev, the pulses 94a can be longer, e.g., ninety microseconds.

As used herein, the pulses 92a, 92b, 94a are referred to as "speed pulses" because a rate of the pulse 92a, 92b, 94a is indicative of at least the speed of rotation (with or without direction information) of the ferromagnetic object 12 (or ring gear 60) of FIG. 1.

In the graph 100, a signal 101 can be comprised of pulses 102a, 102b, 102c, 104a, and 104b, an example of a serial signal that can be the same as or similar to the signal 52 of FIG. 1. In time, the pulses 102a, 102b, 102c, 104a, and 104b can occur proximate to a time of both positive and negative transitions of one of the signals 82a, 84b. Thus, the pulses 102a, 102b, 102c, 104a, and 104b at each half cycle of the signals 72, 74.

A rate of the pulses 102a, 102b, 102c, 104a, and 104b can be indicative of the speed of rotation of the ferromagnetic object 12 (or ring magnet 60). A time period, e.g., respective pulse widths, of the pulses 102a, 102b, 102c, 104a, and 104b can be indicative of a direction of rotation of the ferromagnetic gear (or ring magnet 6)0. Thus, before the time trev, the pulses 102a, 102b, 102c can be shorter, e.g., forty-five microseconds, and after the time trev, the pulses 104a, 104b can be longer, e.g., ninety microseconds.

It should be apparent that a rate of the pulses 102*a*, 102*b*, 102*c*, 104*a*, and 104*b* is twice the rate of the pulses 92*a*, 92*b*, 94*a*.

Embodiments are shown below for which speed pulses are like the speed pulses 92*a*, 92*b*, 94*b*, where one speed pulse occurs on each cycle of the signals 72, 74. However, in other embodiments, like the speed pulses 102*a*, 102*b*, 102*c*, 104*a*, and 104*b*, two speed pulses can occur in each cycle of the signals 72, 74.

Figure 2:
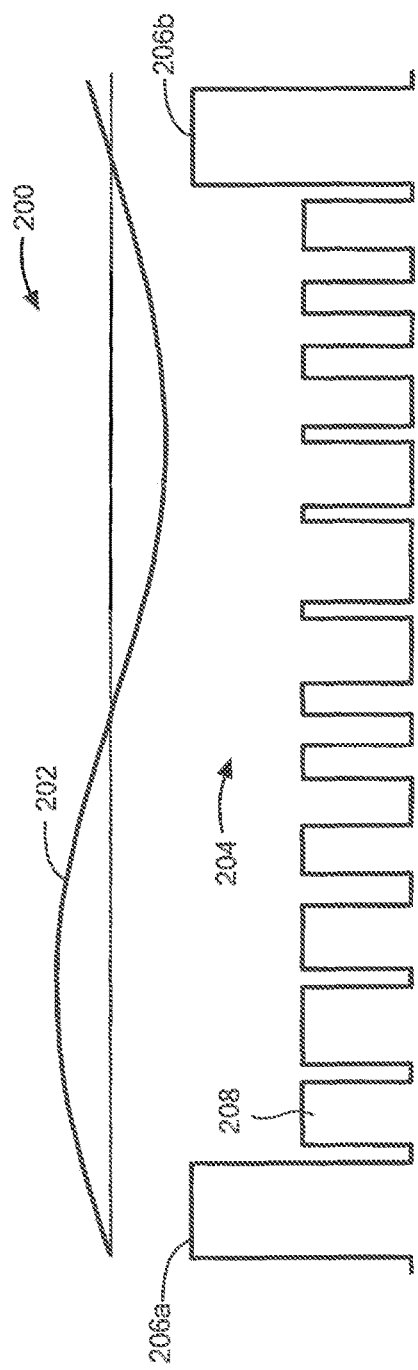
FIG. 2 is a graph showing a magnetic field signal and an example of a corresponding output signal indicative of a speed and/or a direction of a rotation of a ferromagnetic object.

Referring now to FIG. 2, a graph 200 has horizontal dimensions in units of time in arbitrary units and vertical dimensions in units of amplitude in arbitrary units. A signal 202 can be the same as or similar to one of the signals 38*a*, 38*b* of FIG. 1 and one of signals 72, 74 of FIG. 1A, but without a direction change. The signal 202 is generated in accordance with one or more magnetic field sensing elements (e.g., 18, 22 of FIG. 1) in response to a moving ferromagnetic object (e.g., 12 or 60 of FIG. 1).

A signal 204 is comprised of pulses. Tallest pulses 206*a*, 206*b* (the above-described speed pulses) are indicative of pulses generated by a magnetic field sensor, i.e., by the output protocol module 48 of FIG. 1. Each one of the tallest pulses can be indicative of a passing feature (e.g., a gear tooth 12*a*) on a ferromagnetic object 12. Thus, a rate of the speed pulses 206*a*, 206*b* can be indicative of a speed of movement (e.g., a speed of rotation) of the ferromagnetic object 12 or 60.

Further, in some arrangements, as described above in conjunction with graphs 90 and 100 of FIG. 1A, a pulse width of the speed pulses 206*a*, 206*b* can be indicative of a direction of movement (e.g., rotation) of the ferromagnetic target object. U.S. Pat. No. 6,815,944, issued Nov. 9, 2004, assigned to the assignee of the present invention, and incorporated by reference herein in its entirety, describes pulse width direction encoding. Thus, it will be understood that when referring to speed pulses herein, the same pulses can communicate direction of movement by way of pulse widths.

The height of the speed pulses 206*a*, 206*b* can be indicative of a particular predetermined magnitude of current, for example, in a two terminal (i.e., two wire) magnetic field sensor with an associated two wire communication scheme described above in conjunction with FIG. 1. In other arrangements, the height of the speed pulses 206*a*, 206*b* can be indicative of a particular predetermined magnitude of voltage, for example, in a three terminal (i.e. three wire) magnetic field sensor with an associated three wire communication scheme also described above in conjunction with FIG. 1.

High resolution pulses 208 between the speed pulses 206*a*, 206*b* can have pulse widths indicative of pulse width modulation (PWM) in accordance with values of the signal 202. In sonic embodiments, the PWM sweeps in accordance with an instantaneous value of the sinusoid 202. Here, high resolution pulses 208 are shortest as the signal 202 achieves a minimum value and pulses are longest as the signal 202 achieves a maximum value, In other embodiments, the opposite can be generated.

While the speed pulses 206*a*, 206*b* are shown to be larger in amplitude than the PWM high resolution pulses 208, in other embodiments, the speed pulses 206*a*, 206*b* have the same amplitude as the PWM high resolution pulses 208, The same also applies to FIGS. 3-9, It should be apparent that the PWM high resolution pulses 208 can provide a higher resolution identification of a position of the moving, e.g., rotating, ferromagnetic object 12 than can the speed pulses 206*a*, 206*b* alone.

In some embodiments, there can be at least one, at least two, at least three, at least four, at least five, at least six, at least seven, at least eight, at least nine, at least ten, or more than ten PWM high resolution pulses 208 in each cycle of the signal 202, or alternately, in each half cycle of the signal 202.

Since each pulse includes two state transitions, there can be at least two, at least four, at least six, at least eight, at least ten, at least twelve, at least fourteen, at least sixteen, at least eighteen, at least twenty, or more than twenty PWM high resolution pulse transitions in each cycle of the signal 202, or alternately, in each half cycle of the signal 202.

Figure 3:
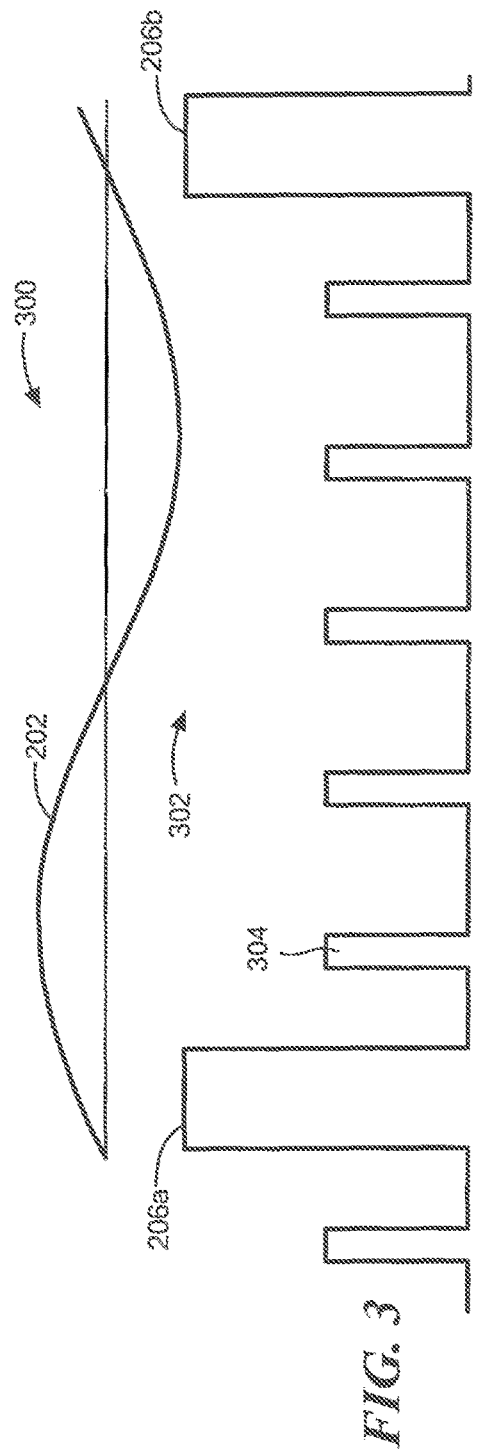
FIG. 3 is a graph showing a magnetic field signal and another example of a corresponding output signal indicative of a speed and/or a direction of a rotation of a ferromagnetic object.

Referring now to FIG. 3, in which like elements of FIG. 2 have the same reference designations, a signal 302 can include the speed pulses 206*a*, 206*b* and also a fixed number of high resolution pulses 304, for example, five pulses, each pulse with equal pulse width. The high resolution pulses 304 can be arranged to fill a time between the speed pulses 206*a*, 206*b*. Thus, the high resolution pulses 304 can compress together or expand apart relative to each other depending upon a rate of the speed pulses 206*a*, 206*b*. In some embodiments, the high resolution pulses 304 can be equally spaced in time. In other embodiments, the high resolution pulses 304 are not equally spaced in time, but are instead a fixed number of pulses.

In some embodiments, there can be at least one, at least two, at least three, at least four, at least five, at least six, at least seven, at least eight, at least nine, at least ten, or more than ten fixed number high resolution pulses 304 in each cycle of the signal 202, or alternately, in each half cycle of the signal 202.

Since each pulse includes two state transitions, there can be at least two, at least four, at least six, at least six, at least ten, at least twelve, at least fourteen, at least sixteen, at least eighteen, at least twenty, or more than twenty high resolution pulse transitions in each cycle of the signal 202, or alternately, in each half cycle of the signal 202.

It should be apparent that the fixed number of pulses 304 can provide a higher resolution identification of a position of the moving, e.g., rotating, ferromagnetic object 12 than can the speed pulses 206*a*, 206*b* alone.

It is indicated by way of the signal 202 that the speed pulses 206*a*, 206*b* occur once per cycle of the signal 202. However, in other embodiments, like the graph 100 of FIG. 1A, there can be two speed pulses in each cycle of the signal 202 and the pulses 304 can be between the two speed pulses per cycle.

In some embodiments, the pulses 304 can have first pulse widths, e.g., forty-five microseconds when the ferromagnetic object 12 or 60 rotates in a first direction, and the pulses 304 can have a second different pulse width, e.g., ninety microseconds, when the ferromagnetic object 12 or 60 rotates in a second different direction. Thus, for some embodiments, the speed pulses 206*a*, 206*b* can be omitted.

Figure 4:
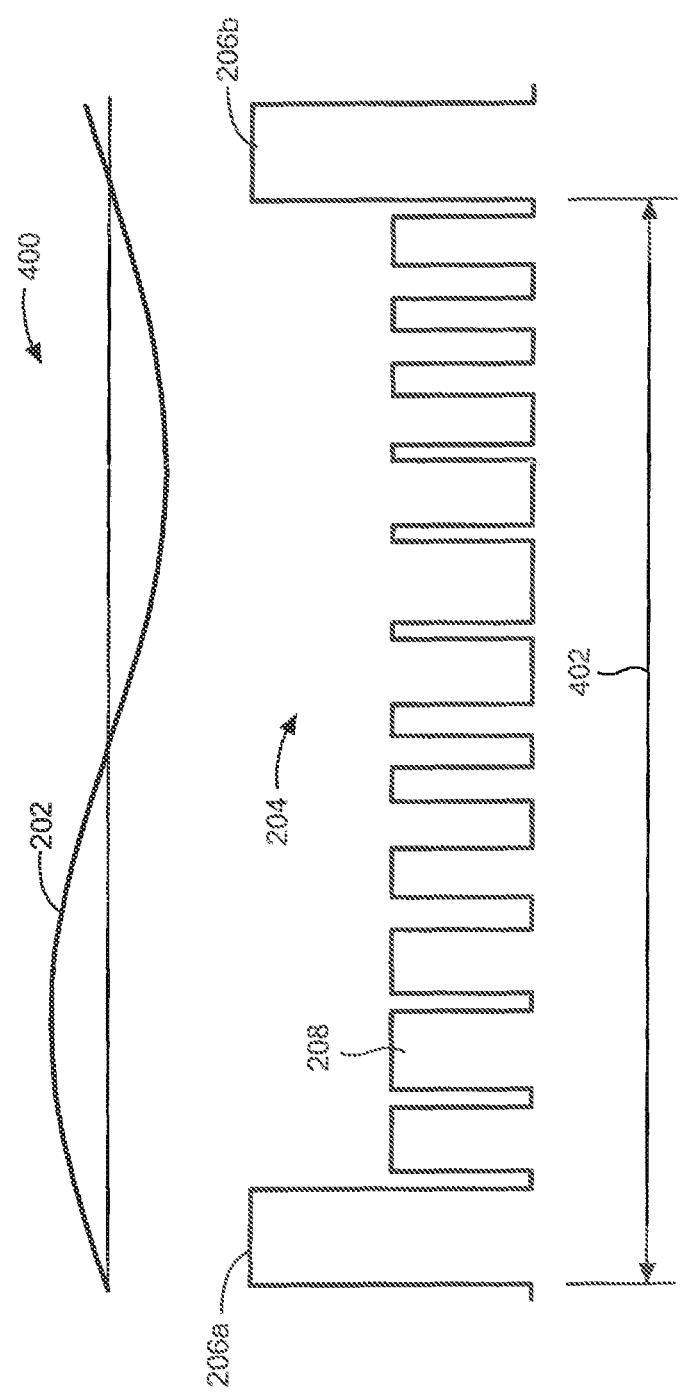
FIG. 4 is a graph showing a magnetic field signal and another example of a corresponding output signal indicative of a speed and/or a direction of a rotation of a ferromagnetic object.

Referring now to FIG. 4, in which like elements of FIG. 2 have the same reference designations, signals 202 and 204 of FIG. 2 are shown again. A time period 402 a frequency of the speed pluses 206*a*, 206*b*) is indicative of a speed of rotation of ferromagnetic object 12.

Figure 5:
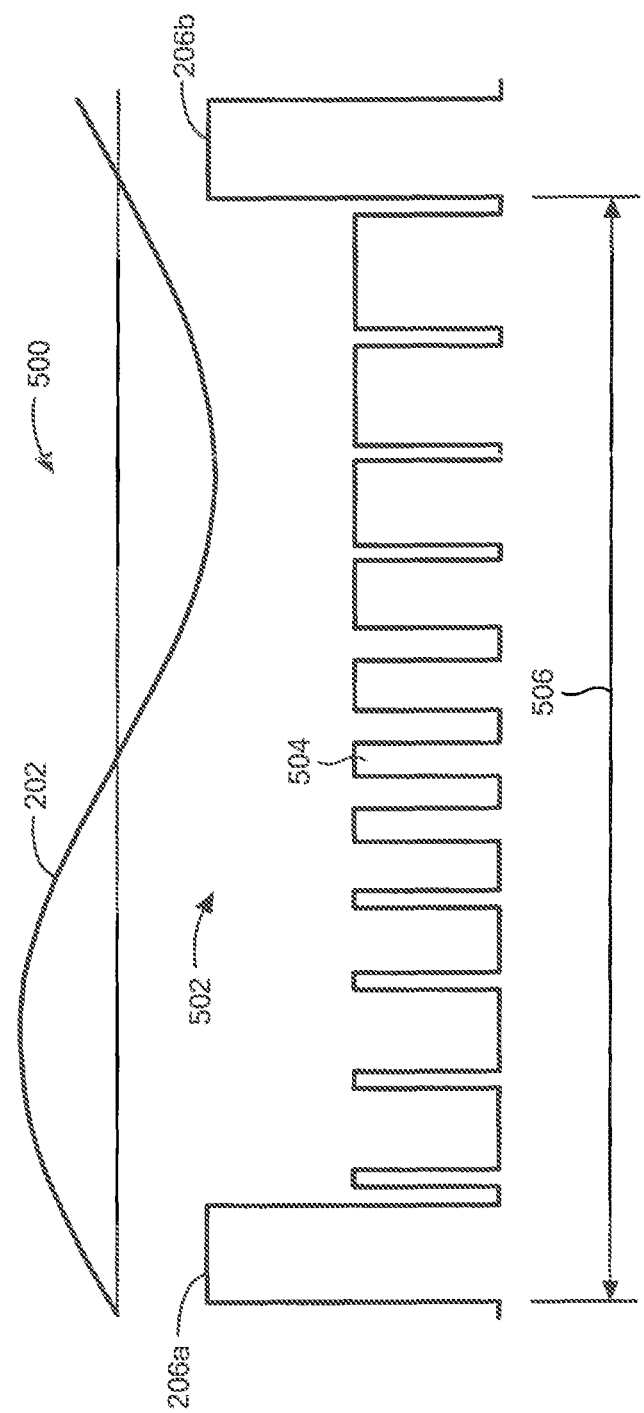
FIG. 5 is a graph showing a magnetic field signal and another example of a corresponding output signal indicative of a speed and/or a direction of a rotation of a ferromagnetic object.

Referring now to FIG. 5, in which like elements of FIG. 2 have the same reference designations, a signal 502 has pulses, including the speed pulses 206*a*, 206*b* described above in conjunction with FIG. 2 and including PWM high resolution pulses 504.

The PWM high resolution pulses 504 between the speed pulses 206*a*, 206*b* can have pulse widths indicative of pulse width modulation (PWM in accordance with, a linear sweep of pulse width between the speed pulses 206a, 206b.

It is shown that the pulse width sweep of the PWM high resolution pulses 504 sweeps in a direction, lowest pulse width to highest pulse width left to right. In other embodiments, the opposite direction PWM sweep can be generated.

It should be apparent that the PWM high resolution pulses 504 can provide a higher resolution identification of a position of the moving, e.g., rotating, ferromagnetic object 12 than can the speed pulses 206a, 206b alone.

It is indicated by way of the signal 202 that the speed pulses 206a, 206b can occur once per cycle of the signal 202. However, in other embodiments, like the graph 100 of FIG. 1A, there can be two speed pulses in each cycle of the signal 202 and the PWM high resolution pulses 504 can be between the two speed pulses per cycle.

In some embodiments, there can be at least one, at least two, at least three, at least four, at least five, at least six, at least seven, at least eight, at least nine, at least ten, or more than ten PWM high resolution pulses 504 in each cycle of the signal 202, or alternately, in each half cycle of the signal 202.

Since each pulse includes two state transitions, there can be at least two, at least four, at least six, at least eight, at least ten, at least twelve, at least fourteen, at least sixteen, at least eighteen, at least twenty, or more than twenty PWM high resolution pulse transitions in each cycle of the signal 202, or alternately, in each half cycle of the signal 202.

As described above in conjunction with FIG. 1A, pulse widths of the speed pulses 206a, 206b can be used to encode direction of movement of the ferromagnetic object. However, it should also be apparent than the direction of rotation can otherwise or also be encoded as a direction of the pulse width sweep (low frequency to high frequency or vice versa) in the PWM signal between the speed pulses 206a, 206b, with or without the encoding of the pulse widths of the speed pulses 206a, 206b. Thus, in some embodiments, the speed pulses 206a, 206b can be omitted.

Referring now to FIG. 6, in which like elements of FIG. 2 shown using like reference designations, a signal 602 can include the speed pulses 206a, 206b and equidistant high resolution pulses 604 between the speed pulses 206a, 206b, the high resolution pulses 604 with fixed separations, and with equal pulse width, also referred to herein as equidistant pulses. High resolution pulses 604 are similar to the pulses 304 of FIG. 3, however, the pulses 304 can be a fixed number of pulses regardless of fixed separation.

It should be apparent that the equidistant high resolution pulses 604 with the fixed time separation can provide a higher resolution identification of a position of the moving, e.g., rotating, ferromagnetic object than can the speed pulses 206a, 206b alone.

It is indicated by way of the signal 202 that the speed pulses 206a, 206b occur once per cycle of the signal 202. However, in other embodiments, like the graph 100 of FIG. 1A, there can be two speed pulses in each cycle of the signal 202 and the equidistant high resolution pulses 604 can be between the two speed pulses per cycle.

In some embodiments, the equidistant high resolution pulses 604 can have first pulse widths, e.g., forty-five microseconds when the ferromagnetic object 12 or 60 rotates in a first direction, and the equidistant high resolution pulses 604 can have a second different pulse width, e.g., ninety microseconds, when the ferromagnetic object 12 or 60 rotates in a second different direction. For these embodiments, the speed pulses 206a, 206b can be omitted.

In some embodiments, there can be at least one, at least two, at least three, at least four, at least five, at least six, at least seven, at least eight, at least nine, at least ten, or more than ten equidistant high resolution high resolution pulses 604 in each cycle of the signal 202, or alternately, in each half cycle of the signal 202.

Since each pulse includes two state transitions, there can be at least two, at least four, at least six, at least eight, at least ten, at least twelve, at least fourteen, at least sixteen, at least eighteen, at least twenty, or more than twenty equidistant high resolution pulse transitions in each cycle of the signal 202, or alternately, in each half cycle of the signal 202.

Referring now to FIG. 7, in which like elements of FIG. 2 shown using like reference designations, a signal 702 can include the speed pulses 206a, 206b and threshold high resolution pulses 704 between the speed pulses 206a, 206b. The threshold high resolution pulses 704 can include one or more pulses (here one pulse) each time the sinusoid crosses a respective threshold, here eight thresholds represented by dashed lines.

While one pulse is shown at each respective threshold crossing of the sinusoid, it should be apparent that there can be one or more pulses at each threshold crossing. Also, there can be different numbers of pulses at the crossings for the thresholds where the sinusoid 202 is above a zero crossing and where the sinusoid 202 is below the zero crossing.

It should be apparent that the threshold high resolution pulses 704 can provide a higher resolution identification of a position of the moving, e.g., rotating, ferromagnetic object than can the speed pulses alone.

It is indicated by way of the signal 202 that the speed pulses 206a, 206b occur once per cycle of the signal 202. However, in other embodiments, like the graph 100 of FIG. 1A, there can be two speed pukes in each cycle of the signal 202 and the threshold high resolution pulses 704 can be between the two speed pulses per cycle.

In some embodiments, the threshold high resolution pulses 704 can have first pulse widths, e.g., forty-five microseconds when the ferromagnetic object 12 or 60 rotates in a first direction, and the threshold high resolution pulses 704 can have a second different pulse width, e.g., ninety microseconds, when the ferromagnetic object 12 or 60 rotates in a second different direction. For these embodiments, the speed pulses 206a, 206b can be omitted.

In some embodiments, associated with a number of thresholds, there can be at least one, at least two, at least three, at least four, at least five, at least six, at least seven, at least eight, at least nine, at least ten, or more than ten threshold high resolution high resolution pulses 704 in each cycle of the signal 202, or alternately, in each half cycle of the signal 202.

Since each pulse includes two state transitions, there can be at least two, at least four, at least six, at least eight, at least ten, at least twelve, at least fourteen, at least sixteen, at least eighteen, at least twenty, or more than twenty threshold high resolution pulse transitions in each cycle of the signal 202, or alternately, in each half cycle of the signal 202.

Referring now to FIG. 8, it should be understood that, referring also to FIGS. 3 and 6 above, as the moving ferromagnetic object moves (e.g., rotates) more quickly, the speed pulses 802a, 802b, 802c, 802d, 802e, 802f move closer together in time. Thus, at very high speeds, the high resolution pulses 804a, 804b, 804c, 804d can degenerate and eventually disappear (e.g., no pulse 804e) at high movement speeds. In FIG. 8, it is shown that the fixed separation high resolution pulses 604 of FIG. 6 or the fixed number of high resolution pulses 304 of FIG. 3 can decrease in number of pukes at higher movement speeds. However, any of the above formats can degrade and disappear at higher movement speeds of the ferromagnetic object. Circuits described below can provide, in some embodiments, a speed detection module to provide this function.

It should be recognized that the speed pulses 802a, 802b, 802c, 802d, 802e, 802f, being closer together at higher movement speeds of the ferromagnetic object, can provide higher resolution of the positions of the ferromagnetic object without the additional high-resolution pulses.

Referring now to FIG. 9, above some predetermined rotation speed, the high-resolution pulses 904a, 904b of any type are not generated at all (no pulses 904c, 904d, 904e). Circuits described below can provide, in some embodiments, a speed detection module to provide this function.

Figure 10:
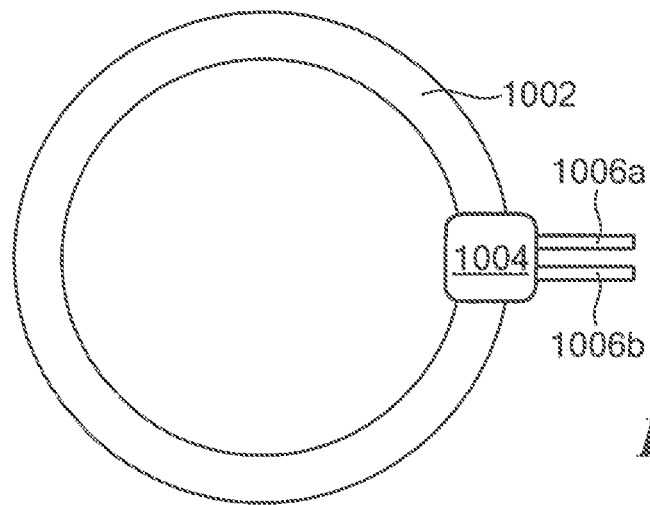
FIG. 10 is a block diagram showing a magnetic field sensor proximate to a ferromagnetic object operable to rotate.

Referring now to FIG. 10, a magnetic field sensor 1004 proximate to a ferromagnetic object 1002 operable to rotate can have two physical pins 1006a 1006b coupled to two physical wires (not shown) to provide a two-wire arrangement in which power is supplied to the magnetic field sensor as a voltage on a first wire and the output signal is a current signal on the same first wire. A second wire can provide a return current.

In these arrangements, the magnetic field sensor 1004 can have one or more magnetic field sensing elements. Embodiments having one magnetic field sensing element can provide speed information but not direction. Embodiments having two or more magnetic field sensing elements can provide speed and direction information.

This arrangement can communicate any of the above signal formats, and also formats below, using two wires.

Figure 11:
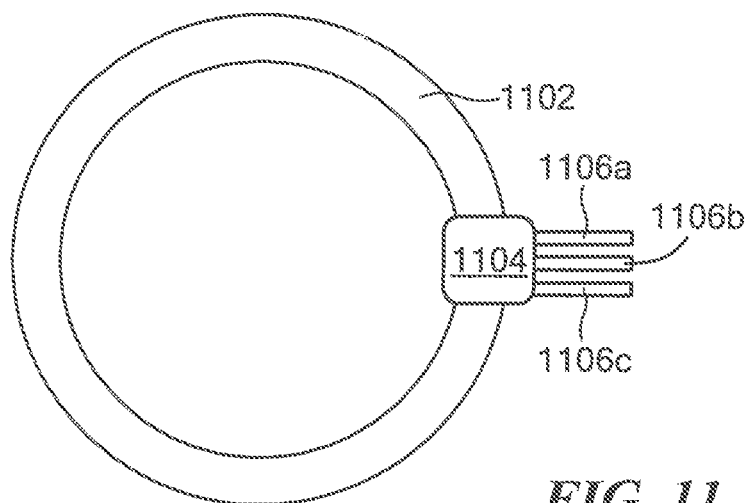
FIG. 11 is a block diagram showing another magnetic field sensor proximate to a ferromagnetic object operable to rotate.

Referring now to FIG. 11, a magnetic field sensor can 1104 proximate to a ferromagnetic object 1102 operable to rotate can have three physical pins 1106a, 1106b, 1106c coupled to three physical wires (not shown) to provide a three-wire arrangement in which power is supplied to the magnetic field sensor as a voltage on a first wire, ground is coupled to a second wire, and the output signal is a voltage or current signal on a third wire.

In these arrangements, the magnetic field sensor 1104 can have one or more magnetic field sensing elements. Embodiments, having one magnetic field sensing element can provide speed information but not direction. Embodiments having two or more magnetic field sensing elements can provide speed and direction information.

This arrangement can communicate any of the above signal formats, and also formats below, using three wires.

Figure 12:
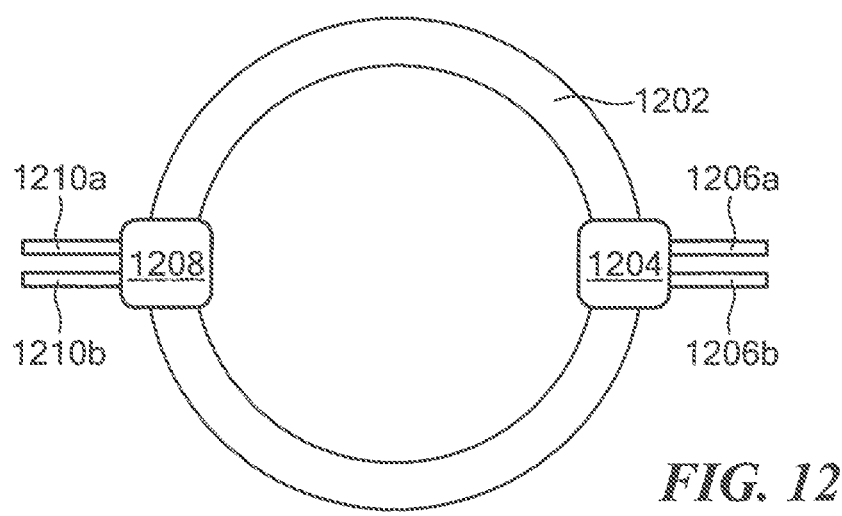
FIG. 12 is a block diagram showing two magnetic field sensors proximate to a ferromagnetic object operable to rotate.

Referring now to FIG. 12, two magnetic field sensors 1204, 1208 proximate to a ferromagnetic object 1202 operable to rotate can each have two (or three) physical pins 1206a, 1206b and 1210a, 1210b coupled to two (or three) physical wires (not shown) to provide a double two-wire, (or three-wire) arrangement.

In these arrangements, each magnetic field sensor 1204, 1206 can have one or more magnetic field sensing elements. Embodiments that have one magnetic field sensing element in each can provide speed information but not direction. Embodiments that have two or more magnetic field sensing elements in each can provide speed and direction information.

This arrangement can communicate any of the above signal formats, and also formats below, using four (or six) wires.

Figure 13:
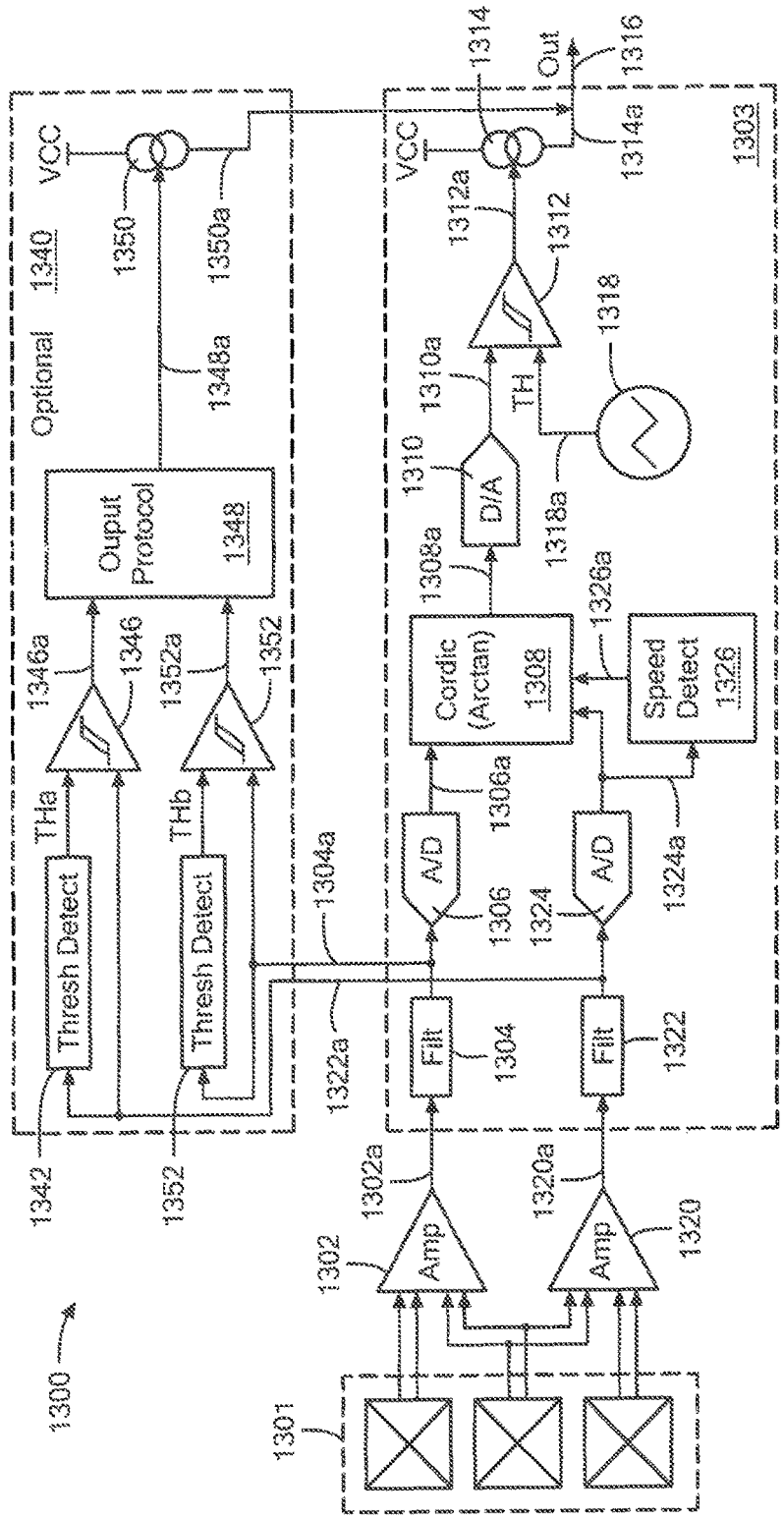
FIG. 13 is a block diagram showing an example of an electronic circuit that can be within a magnetic field sensor and that can generate a signal similar to the signal of FIG. 5.
Figure 13:
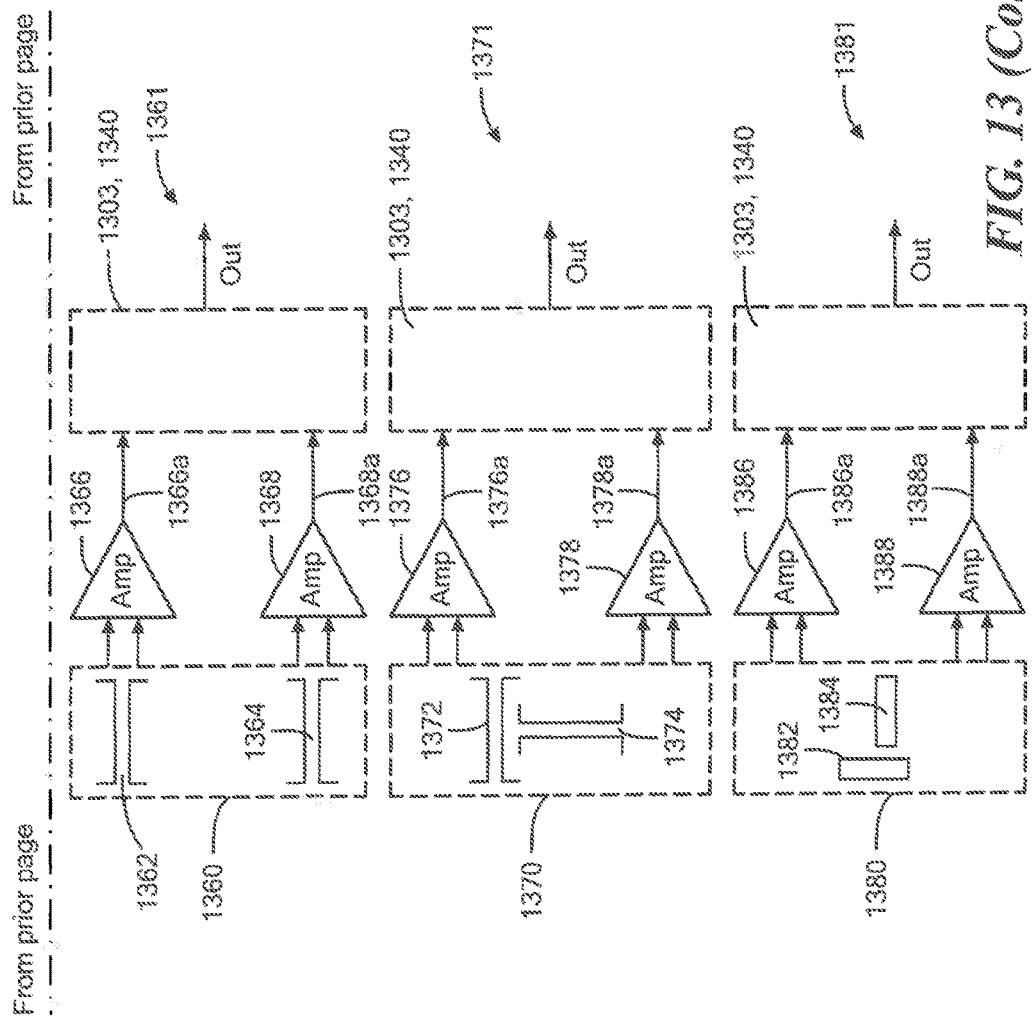

Referring now to FIG. 13, examples of magnetic field sensors 1300, 1361, 1371, 1381 can include a variety of different arrangements of magnetic field sensing elements. Magnetic field sensor 1300 shows an arrangement 1301 with three planar Hall elements. In other embodiments, an arrangement 1360 in the magnetic field sensor 1361 can comprise two magnetoresistance elements arranged as two bridges with fixed resistors (not shown), an arrangement 1370 in the magnetic field sensor 1371 can comprise two magnetoresistance elements arranged as two bridges with fixed resistors (not shown) and physically arranged at ninety degrees to each other, and an arrangement 1380 in the magnetic field sensor 1381 can have two vertical Hall elements physically arranged at ninety degrees to each other. Other arrangements of magnetic field sensing elements are also possible here and in figures below.

In the magnetic field sensor 1300, with the three planar Hall element arrangement 1301 as an example, two electronic channels can include respective amplifiers 1302, 1320 coupled to receive sensing element signals (magnetic field signals) from the three Hall elements 1301 and configured to generate respective amplified signals 1302a, 1320a (also sensing element signals or magnetic field signals). Respective filters 1304, 1322 can e coupled to the amplified signals 1302a, 1322a, respectively, and can be operable to generate respective filtered signals 1304a, 1322a (also sensing element signals or magnetic field signals). Respective analog-to-digital (A/D) converters 1306, 1326 can be coupled to receive the filtered signals 1304a, 1322a, respectively, and configured to generate digital converted signals 1306a, 1324a, respectively (also sensing element signals or magnetic field signals). A coordinate rotation digital computer (CORDIC) function module 1308 can receive the digital converted signals 1306a, 1326 and can be operable to compute an arctangent of the two digital converted signals 1306a, 1324a to generate an arctan signal 1308a.

For a particular phase polarity of the two digital converted signals 1306a, 1324a (i.e., a particular direction of movement of the ferromagnetic object), and for a regular rotation, the arctan signal 1308a generated by the CORDIC function module 1308 can be a digital ramp that sweeps linearly (e.g., straight line linearly) from a smallest value (e.g., zero) to a maximum value and then resets to zero to begin each successive ramp. For the other phase polarity (i.e., other rotation direction), the digital ramp can sweep in the opposite direction, from largest to smallest value.

A digital-to-analog converter 1310 can receive the arctan signal 1308a and can generate an analog converted signal 1310a (e.g., an analog ramp signal).

A comparison circuit 1312 can receive the analog converted signal 1310a and can receive a triangle signal 1318a from a triangle waveform generator 1318. The comparison circuit 1312 can generate a PWM high resolution voltage signal 1312a with a range of pulse widths related to a frequency of the triangular clock signal. The PWM high resolution voltage signal 1312a sweeps pulse widths in a direction according to a direction of the above analog converted signal 1310a (ramp).

A current generator 1314 can be coupled to the PWM high resolution voltage signal 1312s and operable to generate a PWM high resolution current signal 1314a.

A speed pulse generating circuit 1340 can be the same as or similar to part of the magnetic field sensor 10 of FIG. 1. Threshold detectors 1342, 1362 can be the same as of similar to the threshold detectors 40a, 40b of FIG. 1, and comparators 1436, 1452 can be the same as or similar to the comparators 44a, 44b of FIG. 1. An output protocol module 1348 can be operable to generate a speed pulse voltage signal 1348a (see, e.g., 92a, 92b, 92c of 102a, 102b, 102c, 104a, 104b of FIG. 1A or 206a, 206b of FIG. 2).

A current generator 1350 can be coupled to receive the speed pulse voltage signal 1348*a* and operable to generate a speed pulse current signal 1350*a*.

The PWM high resolution current signal 1314*a* can be coupled to the speed pulse current signal 1350*a* (added) to provide a composite signal 1316 having both the PWM high resolution current signal 1314*a* and the speed pulse current signal 1350*a*.

It should be apparent that the arrangement of FIG. 13 can generate a signal similar to the linear PWM high resolution signal 504 of FIG. 5. However, in some other embodiments, the arrangement of FIG. 13 can generate the signal like the signal of FIG. 5, but without the speed pulses, and the speed pulse generating circuit 1340 can be omitted. The speed pulses of the speed pulse current signal 1350*a* may be redundant with information carried by the PWM high resolution current signal 1314*a*. Namely, a rate of resetting of the PWM high resolution current signal 1314*a* (i.e., 1316) can be indicative of the speed of movement of the ferromagnetic object, and a direction of the PWM sweep of the PWM high resolution current signal 1314*a* (i.e., 1316) can be indicative of a direction of movement of the ferromagnetic object.

As described above, in embodiments, the output signal (e.g., 1316) can be communicated as a current or as a voltage, either on a two wire or a three wire arrangement to a central processor for further interpretation.

A speed detection module 1326 can be coupled to one of the digital converted signals, e.g., 1324*a* and can be operable to generate a speed detect signal 1326*a* indicative of a speed of rotation of a ferromagnetic object. In some embodiments, the speed detect signal 1326*a* can disable the CORDIC, module 1308 at rotation speeds above a predetermine rotation speed, leaving only the speed pulse current signal 1350*a* and disabling the PWM high resolution current signal 1314*a*.

In some embodiments, the A/D converters 1408, 1428, and A/D converters described below, can be sigma delta converters.

Figure 14:
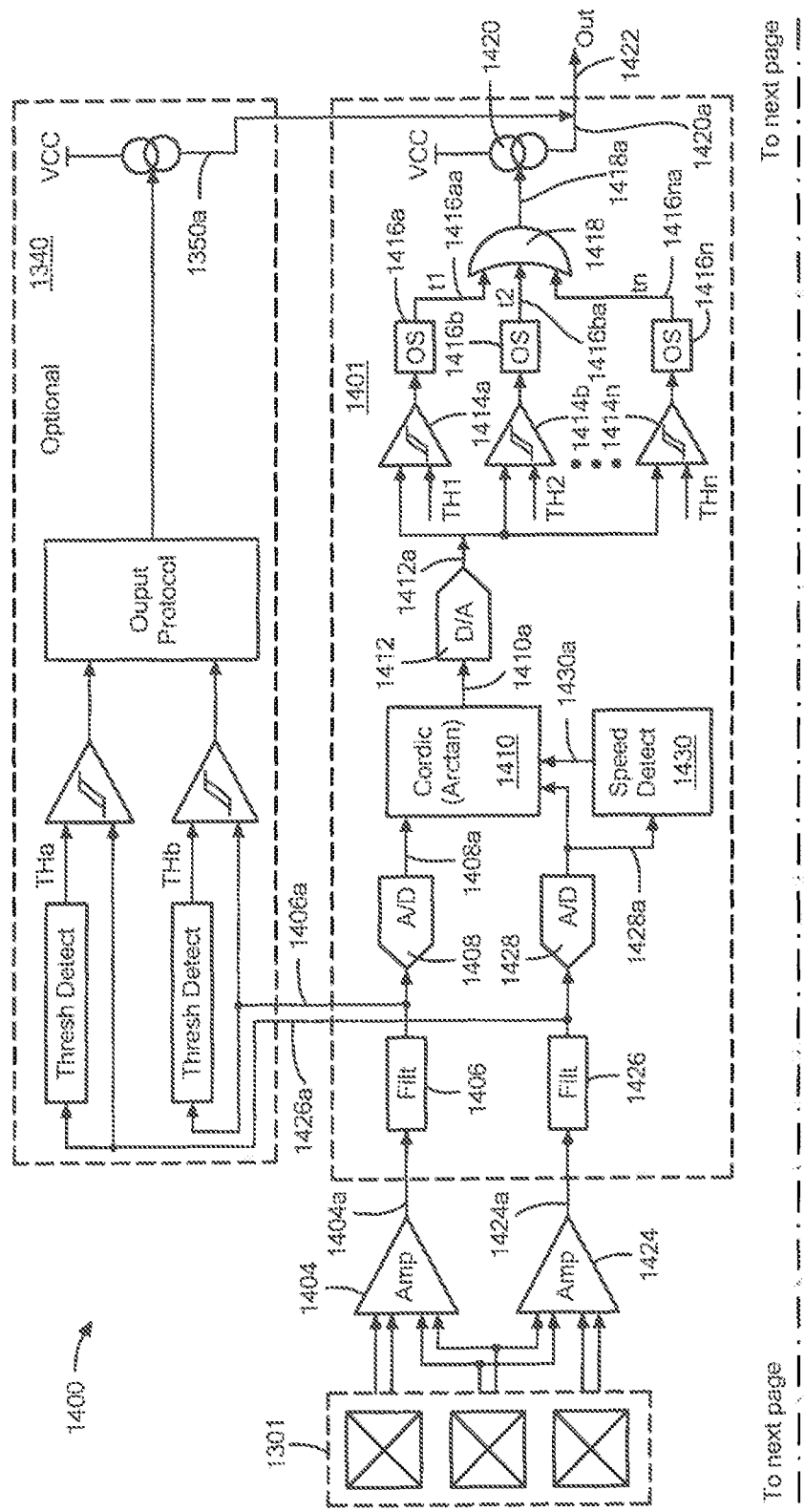
FIG. 14 is a block diagram showing an example of an electronic circuit that can be within a magnetic field sensor and that can generate a signal similar to the signal of FIG. 3 or 6.
Figure 14:
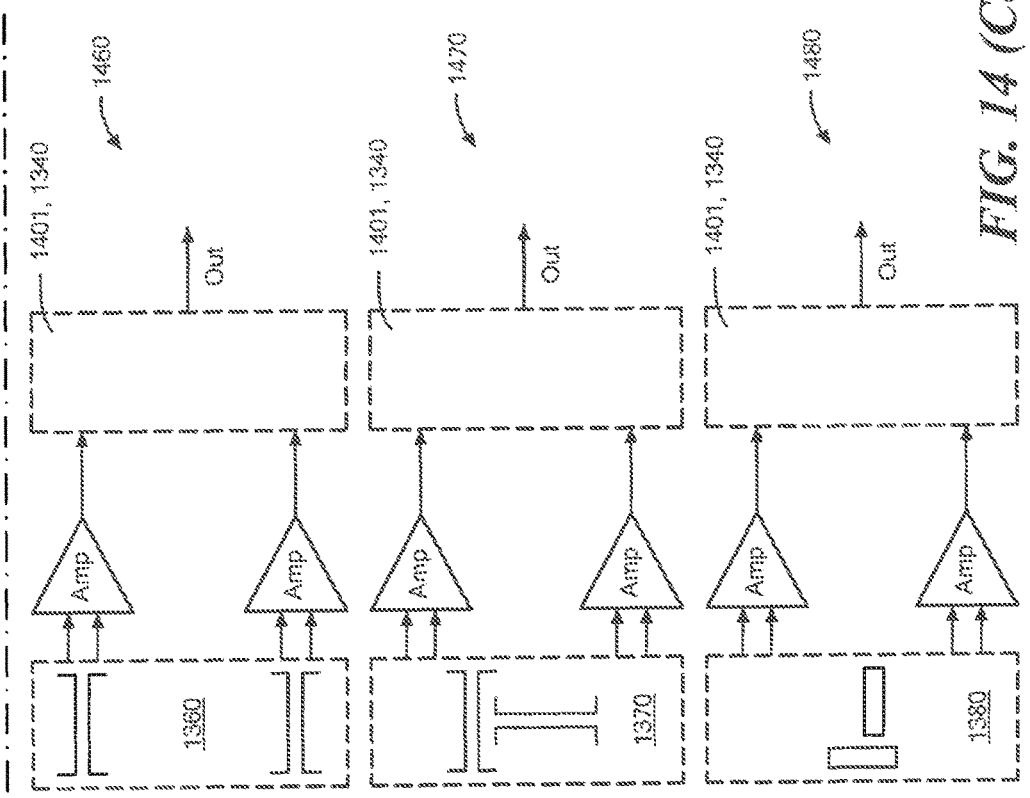

Referring now to FIG. 14, in which like elements of FIG. 13 are shown having like reference designations, examples of magnetic field sensors 1400, 1460, 1470, 1480 can include the variety of different the arrangements 1301, 1360, 1370, 1380 of magnetic field sensing elements.

In the magnetic field sensor 1400, with the three planar Hail element arrangement 1301 as an example, two electronic channels can include respective amplifiers 1404, 1424 coupled to receive sensing element signals from the three Hall elements 1301 and configured to generate respective amplified signals 1404*a*, 1424*a*. Respective filters 1406, 1426 can be coupled to the amplified signals 1404*a*, 1424*a*, respectively, and can be operable to generate respective filtered signals 1406*a*, 1426*a*. Respective analog-to-digital (A/D) converters 1408, 1428 can be coupled to receive the filtered signals 1406*a*, 1426*a*, respectively, and configured to generate digital converted signals 1408*a*, 1428*a*, respectively. A CORDIC function module 1410 can receive the digital converted signals 1408*a*, 1428*a* and can be operable to compute an arctangent of the two digital converted signals 1408*a*, 1428*a*.

For a particular phase polarity of the two digital converted signals 1408*a*, 1428*a* (i.e., a particular direction of movement of the ferromagnetic object) an arctan signal 1410*a* generated by the CORDIC function module 1410 can be a digital ramp that sweeps linearly (e.g., straight line linearly) from a smallest values (e.g., zero) to a maximum value (e.g., one) and then resets to zero to begin each successive ramp. For the other phase polarity (i.e., other rotation direction), the digital ramp can sweep in the opposite direction, from largest to smallest value.

A digital-to-analog converter 1412 can receive the arctan signal 1410*a* and can generate an analog converted signal 1412*a*, i.e., an analog ramp signal.

A plurality of comparison circuits 1414*a*, 1414*b*, 1414*n* can be coupled to receive the analog converted signal 1412*a* and can compare the analog converted signal 1412 with a plurality of different fixed threshold values Th1, TH2, THn, to generate a plurality of comparison signals.

A plurality of one-shot circuits 1416*a*, 1416*b*, 1416*n*. (i.e., monostable muitivibrators) can be coupled to receive respective ones of the plurality of comparison signals and can be operable to generate a respective plurality of fixed pulse width pulses 1416*aa*, 1416*ba*, 1416*na*. In some embodiments, the plurality of fixed pulse width pulses 1416*aa*, 1416*ba*, 1416*na* can each have the same pulse width, like the pulses of FIG. 6. Unlike the arrangement of FIG. 6, in some embodiments, the plurality of fixed pulse width pulses 1416*aa*, 1416*ba*, 1416*na* can have different pulse widths from shortest to longest or from longest to shortest depending up a direction of the ramp signal generated by the CORDIC module 1410

A multi-input OR gate 1410 an be coupled to receive the plurality of fixed pulse width pulses 1416*aa*, 1416*ab*, 1416*an*. The multi-input OR gate can generate the plurality of fixed pulse width pulses 1416*aa*, 1416*ba*, 1416*na* in a serial form and with a constant pulse separation as a high resolution pulse voltage signal 1418*a*.

A current generator 1420 can be coupled to receive the high resolution pulse voltage signal 1418*a* and can be operable to generate a high resolution pulse current signal 1420*a*, The high resolution pulse current signal 1420*a* can be coupled to the speed pulse current signal 1350*a* to provide a composite signal 1422 having both the high resolution pulse current signal 1420*a* and the speed pulse current signal 1350*a*.

It should be apparent that the magnetic field sensor of FIG. 14 can generate the pulses with constant pulse separation like those described above in conjunction with FIG. 6 or with fixed number of pulses like those described above in conjunction with FIG. 3. Depending upon the threshold values TH1, TH2, THn, the quantity of pulses may be fixed, but the separations may be different, e.g., the arrangement of FIG. 3.

In some embodiments, the arrangement of FIG. 14 can generate the signal like the signal of FIG. 3 or 6, but without the speed pulses. The speed pulses may be redundant with information carried by the high resolution pulses 604 of FIG. 6 or high resolution pulses 304 of FIG. 3. In some embodiments a rate of the high resolution fixed pulse width pulses I418*a* can be indicative of the speed of movement of the ferromagnetic object, and a direction of increase or decrease of pulse widths of the high resolution pulses (i.e., longer to shorter versus shorter to longer) can be indicative of a direction of movement of the ferromagnetic object. Alternatively, a rate of the fixed pulse width pulses 1418*a* can be indicative of the speed of movement of the ferromagnetic object, and a height or magnitude of the fixed separation pulses 1418*a* (i.e., smaller versus larger) can be indicative of a direction of movement of the ferromagnetic object.

As described above, the output signal 1422 can be communicated as a current or as a voltage, either one on a two wire or a three wire arrangement to a central processor for further interpretation.

A speed detection module 1430 can be coupled to one of the digital converted signals, e.g., 1428a and operable to generate a speed detect signal 1430a indicative of a speed of rotation of a ferromagnetic object. In some embodiments, the speed signal detect signal 1430a can disable the CORDIC module 1410 at rotation speeds above a predetermine rotation speed, leaving only the speed pulse current signal 1350 and disabling the PWM high resolution current signal 1420a.

Figure 15:
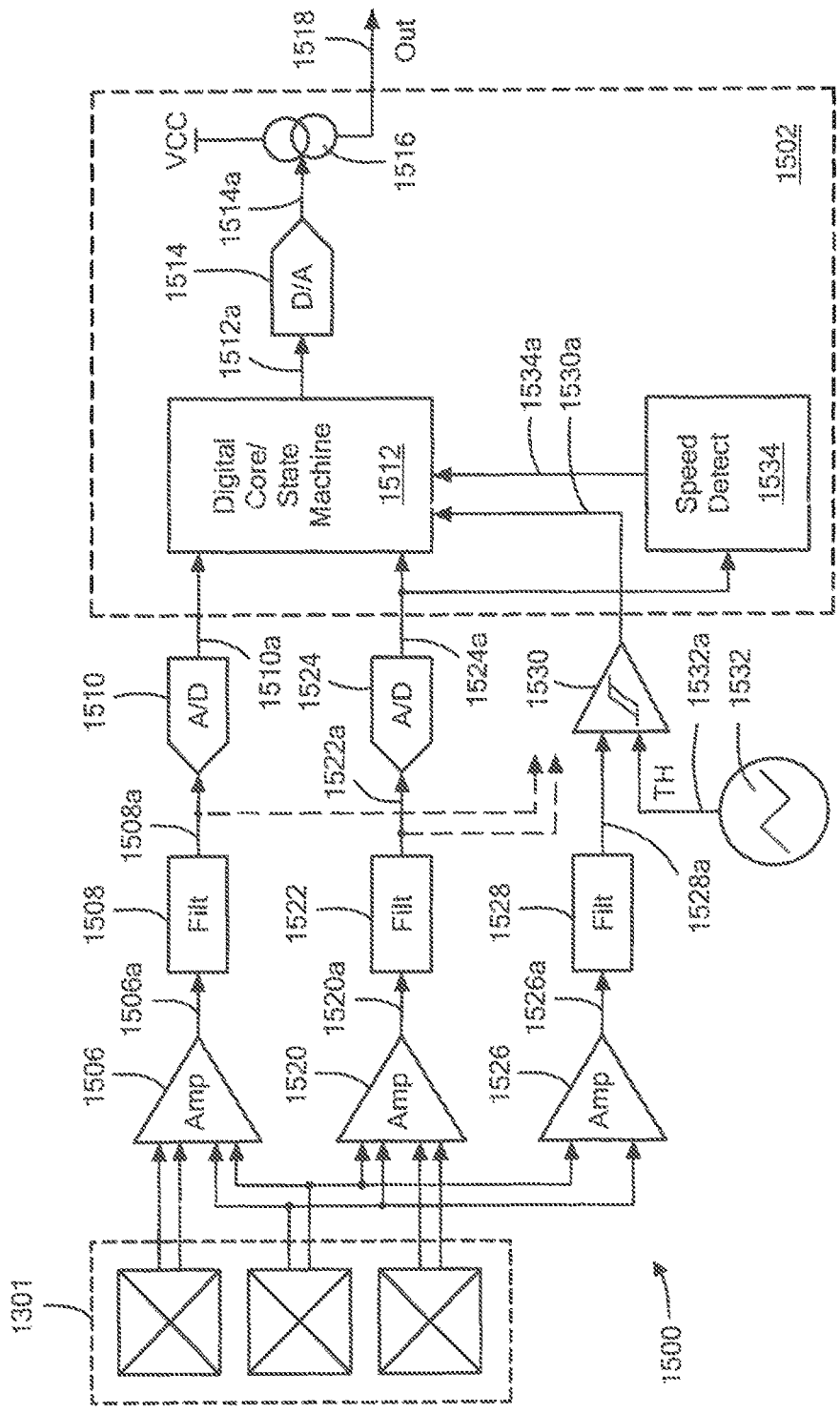
FIG. 15 is a block diagram showing an example of an electronic circuit that can be within a magnetic field sensor and that can generate a signal similar to the signal of FIG. 2 or 4.
Figure 15:
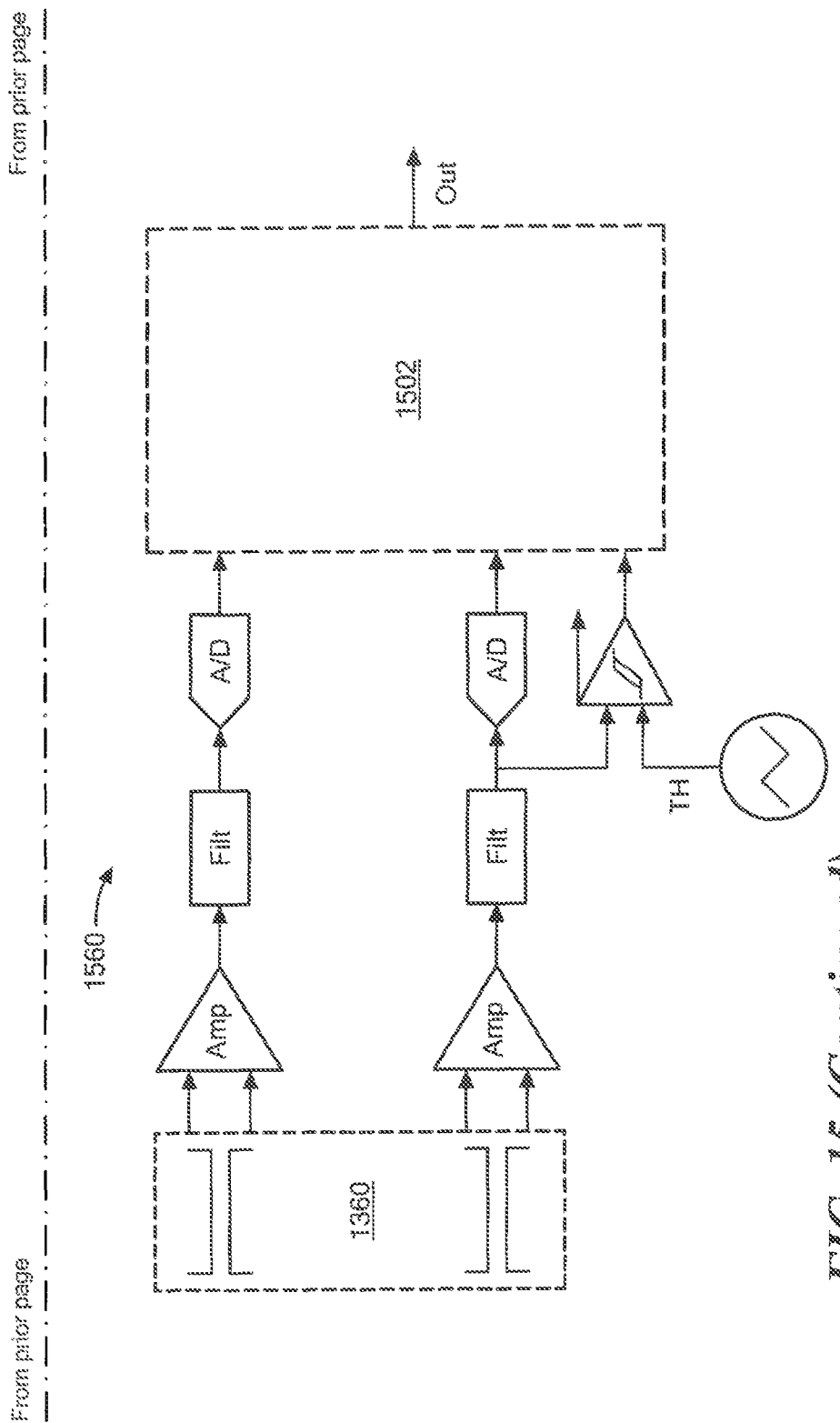

Referring now to FIG. 15, in which like elements of FIGS. 13 and 14 are shown having like reference designations, example magnetic field sensors 1500, 1560 can include the variety of different arrangements 1301, 1360 of magnetic field sensing elements. Other arrangements 1370, 1380 of FIGS. 13 and 14 are also possible but not shown.

In the magnetic field sensor 1500, with the three planar Hall element arrangement 1301 as an example, two electronic channels can include respective amplifiers 1506, 1520 coupled to receive sensing element signals from the three Hall elements 1301 and configured to generate respective amplified signals 1506a, 1520a. Respective filters 1508, 1522 can be coupled to the amplified, signals 1506a, 1520a, respectively, and can be operable to generate respective filtered signals 1508a, 1522a. Respective analog-to-digital (A/D) converters 1510, 1524 can be coupled to receive the filtered signals 1508a, 1522a, respectively, and configured to generate digital converted signals 1510a, 1524a, respectively. A digital core and/or state machine 1512 can receive the digital converted signals 1510a, 1524a and can be operable to compute and generate a digital output signal 1512a.

A third signal channel can receive a signal from one or more of the magnetic field sensing elements, e.g., planar Hall elements, The signal received from the magnetic field sensing elements in the third signal channel can be generally sinusoidal in nature. The third signal channels can have an amplifier 1526 to generate an amplified signal 1526a, and a filter 1528 to receive the amplified signal 1526a and to generate a filtered signal 1528a.

A comparator 1530 can receive the filtered signal 1528a. The comparator can also receive a triangle signal 1532a, which can be generated by a triangle generator 1532. The comparator 1530 can generate a PWM high resolution signal 1530a that can be received by the digital core and/or state machine 1512. It should be understood that the comparator 1530 is operable to compare the filtered signal 1528a with the triangle wave signal 1532a (used as a moving threshold) to generate the pulse width modulated (PWM) high resolution signal 1530a.

In some embodiments, the amplifier 1526 and the filter 1528 of the third signal channel can be replaced by similar components of the two primary signal channels, in which case, the comparator 1530 can receive, instead of the filtered signal 1528a, one of the filtered signals 1508a, 1522a.

With the signals 1510a, 1524a, 1530a received by the digital core and/or state machine 1512, the digital core and/or state machine 1512 can construct the signal 1512a with format of FIG. 2 or 4, including the speed pulses 206a, 206b and including the PWM high resolution pulses 208. To this end, in some embodiments, the digital core and/or state machine 1512 can include a digital version of the detection circuit 1340 of FIG. 13.

The digital core and/or state machine 1512 can be operable to generate a composite digital signal 1512a having information including one of or both of both the speed pulses 206a, 206b and the PWM high resolution pulses 208 of FIGS. 2 and 4.

A digital-to-analog converter 1514 can be coupled to receive the composite digital signal 1512 can be operable to generate an analog converted signal 1514a including one of or both of both the speed pulses 206a, 206b and the PWM high resolution pulses 208 of FIGS. 2 and 4.

A current generator 1516 can receive the analog converted signal 1514a and can be operable to generate a current signal 1518 version of the analog converted signal 1514a.

In some embodiments, a speed detection module 1534 can be coupled to one of the digital converted signals, e.g., 1524a, and can be operable to generate a speed detect signal 1534a indicative of a speed of rotation of a ferromagnetic object. In some embodiments, the speed signal detect signal 1534a can change operation of the digital core and/or state machine 1512 at rotation speeds above a predetermine rotation speed, leaving only speed pulses in the current signal 1518 and disabling the PWM high resolution current signal in the current signal 1518.

A magnetic field sensor 1560 is similar to the magnetic field sensor 1500 and uses the circuit 1502, but uses the magnetic field sensing element arrangement 1360 instead of the magnetic field sensor arrangement 1301. Operation of the magnetic field sensor 1560 will be understood from discussion above.

Figure 16:
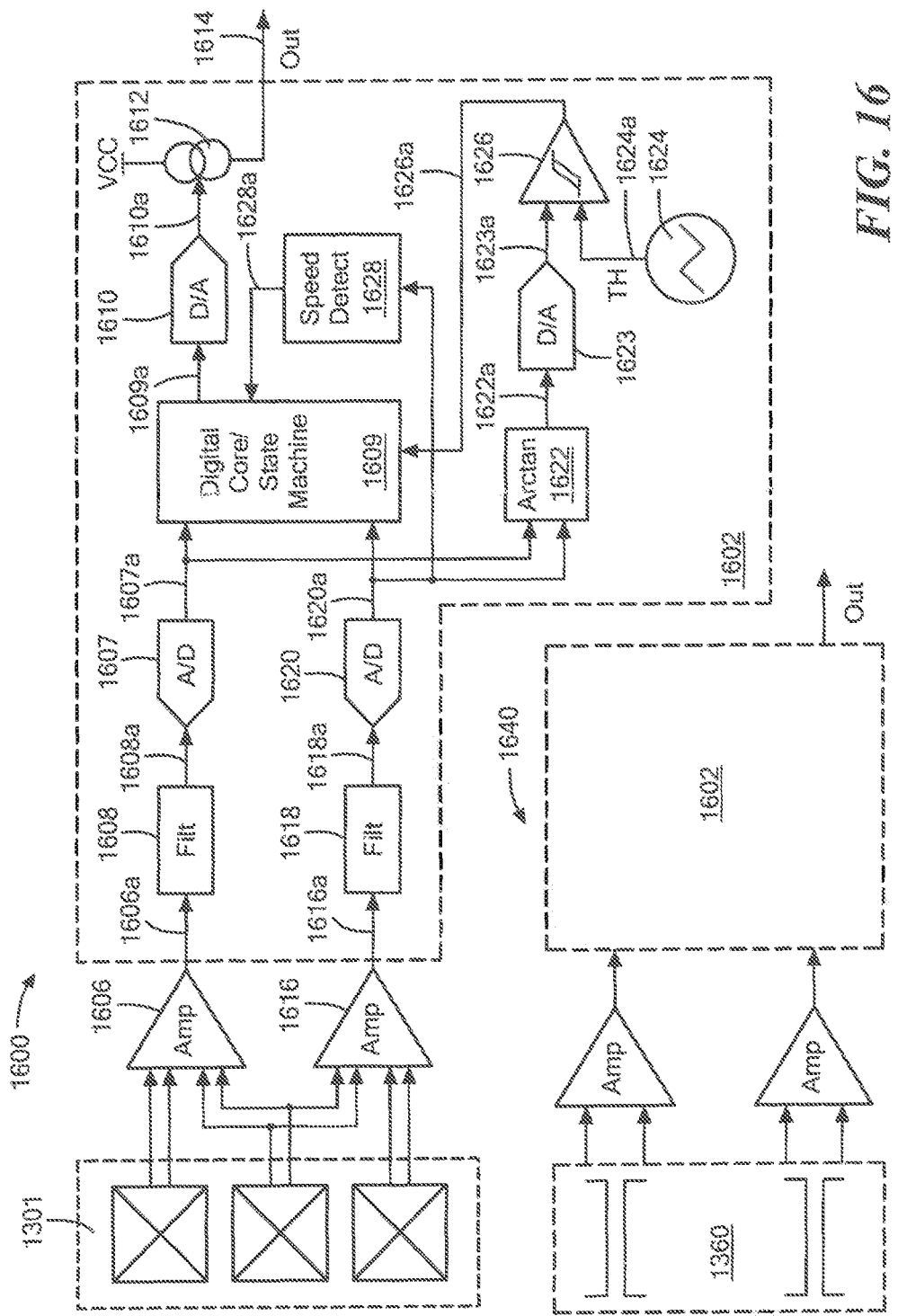
FIG. 16 is a block diagram showing an example of an electronic circuit that can be within a magnetic field sensor and that can generate a signal similar to the signal of FIG. 5.

Referring now to FIG. 16, in which like elements of FIGS. 13, 14, and 15 are shown having like reference designations, example magnetic field sensors 1600, 1640 can include the variety of different arrangements 1301, 1360 of magnetic field sensing elements. Other arrangements 1370, 1380 of FIGS. 13 and 14 are also possible but not shown.

In the magnetic field sensor 1600, with the three planar Hall element arrangement 1301 as an example, two electronic channels can include respective amplifiers 1606, 1616 coupled to receive sensing element signals from the three Hall elements 1301 and configured to generate respective amplified signals 1606a, 1616a. Respective filters 1608, 1618 can be coupled to the amplified signals 1606a, 1616a, respectively, and can be operable to generate respective filtered signals 1608a, 1618a. Respective analog-to-digital (A/D) converters 1607, 1620 can be coupled to receive the filtered signals 1608a, 1618a, respectively, and configured to generate digital converted signals 1607a, 1620a, respectively. A digital core and/or state machine 1609 can receive the digital converted signals 1607a, 1620a and can be operable to compute and generate a digital output signal 1609a.

An arctan module (e.g., a CORDIC module) can receive the two digital converted signals 1607a, 1620a and can be operable to generate an arctan signal 1622a, which can be representative of a digital ramp as the ferromagnetic object 12 (or 60) of FIG. 1 rotates. A digital-to-analog converter 1623 can receive the arctan signal 1622 and can be operable to generate an analog converted signal 1623a.

A comparator 1626 can receive the analog converted signal 1623a. The comparator 1626 can also receive a triangle signal 1624a, which can be generated by a triangle generator 1624. The comparator 1626 can generate a PWM high resolution signal 1626a that can be received by the digital core and/or state machine 1609. It should be understood that the comparator 1626 is operable to compare the analog converted signal 1628a with the triangle wave signal 1624a (used as a moving threshold) to generate the pulse width modulated (PWM) high resolution signal 1626a.

The digital core and/or state machine 1609 can be operable to generate a composite digital signal 1609a having digital versions of both the PWM high resolution signal 1626a and also a digital version of speed pulses, e.g., 206a, 206b of FIG. 5.

A digital-to-analog converter 1610 can be coupled to receive the composite digital signal 1609a can be operable to generate an analog converted signal 1610a.

A current generator 1612 can receive the analog converted signal 1610a and can. be operable to generate a current signal 1614 version of the analog converted signal 1610a.

With the signals 1607a, 1620a, 1626a received by the digital core and/or state machine 1609, the digital core and/or state machine 1609 can construct the current signal 1612a with format of FIG. 5, including the speed pulses 206a, 206b and including the PWM high resolution pulses 504. To this end, in some embodiments, the digital core and/or state machine 1609 can include a digital version of the detection circuit 1340 of FIG. 13.

In some embodiments, a speed detection module 1628 can be coupled to one of the digital converted signals, e.g., 1620a, and operable to generate a speed detect signal 1628a indicative of a speed of rotation of the ferromagnetic object 12 (or 60) of FIG. 1. In some embodiments, the speed signal detect signal 1628a can change operation of the digital core and/or state machine 1609 at rotation speeds above a pre-determine rotation speed, leaving only speed pulses in the current signal 1614 and disabling the high resolution pulses in the current signal 1614.

A magnetic field sensor 1640 is similar to the magnetic field sensor 1600 and include circuit 1602, but uses the magnetic field sensing element arrangement 1360 instead of the magnetic field sensor arrangement 1301. Operation of the magnetic field sensor 1640 will be understood from discussion above.

Figure 17:
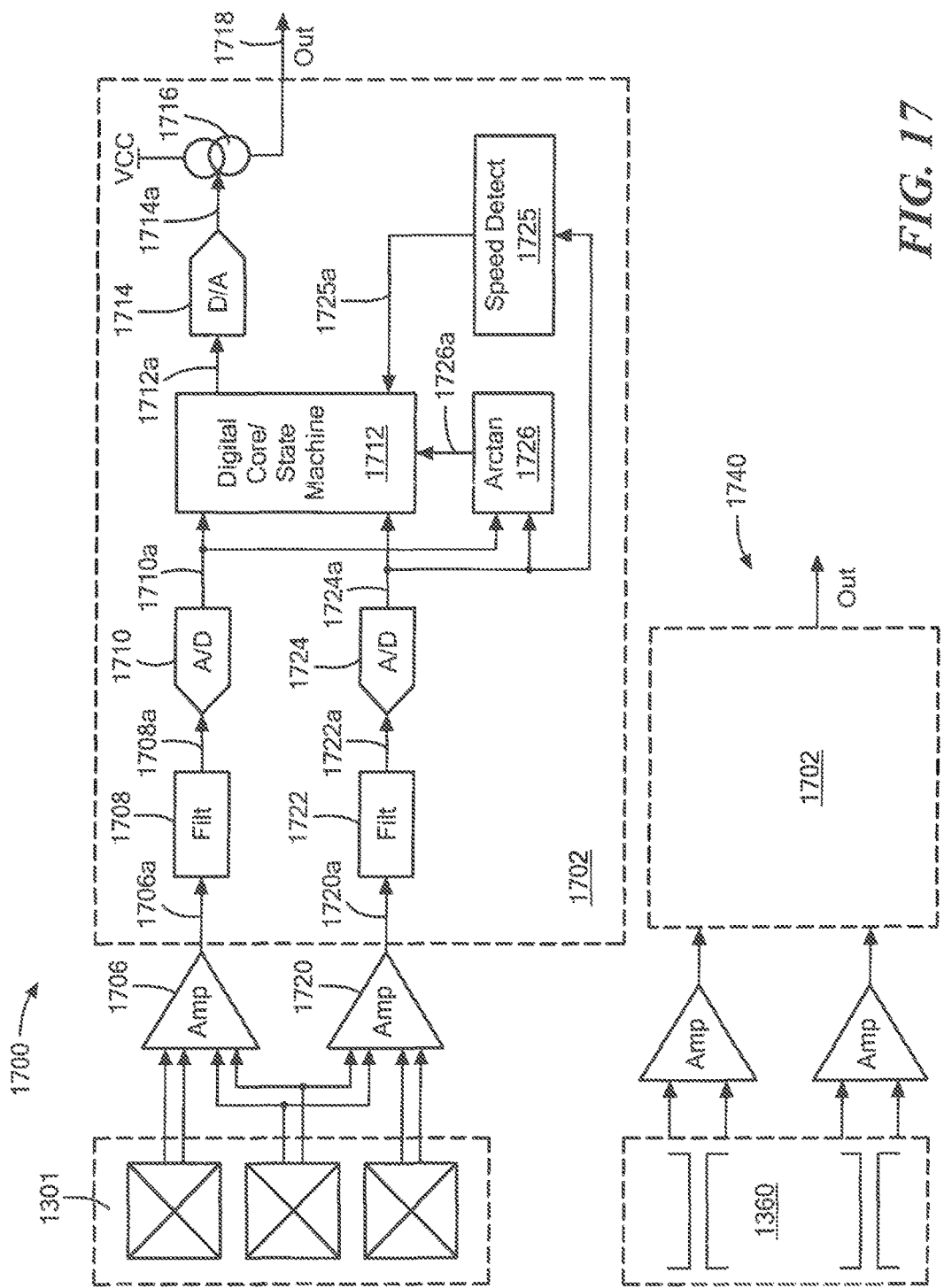
FIG. 17 is a block diagram showing an example of an electronic circuit that can be within a magnetic field sensor and that can generate a signal similar to the signal of FIGS. 3 or 6.

Referring now to FIG. 17, in which like elements of FIGS. 13-16 are shown having like reference designations, example magnetic field sensors 1700, 1740 can include the variety different arrangements 1301, 1360 of magnetic field sensing elements. Other arrangements 1370, 1380 of FIGS. 13 and 14 are also possible hut not shown.

In the magnetic field sensor 1700, with three planar Hall elements as an example, two electronic channels can include respective amplifiers 1706, 1720 coupled to receive sensing element signals from the three Hall elements 1301 and configured to generate respective amplified signals 1706a, 1720a. Respective filters 1708, 1722 can be coupled to the amplified signals 1706a, 1720a, respectively, and can be operable to generate respective filtered signals 1708a, 1722a. Respective analog-to-digital (A/D) converters 1710, 1724 can be coupled to receive the filtered signals 1708a, 1722a, respectively, and configured to generate digital converted signals 1710a, 1724a, respectively. A digital core and/or state machine 1712 can receive the digital converted signals 1710a, 1724a and can be operable to compute and generate a digital output signal 1712a.

An arctan module (e.g., a CORDIC module) 1726 can receive the two digital converted signals 1710a, 1724a and can be operable to generate an arctan signal 1726a, which can be representative of a digital ramp as the ferromagnetic object 12 (or 60) of FIG. 1 rotates. The digital core and/or state machine 1712 can receive the arctan signal 1726a.

The digital core and/or state machine 1712 can be operable to generate a composite digital signal 1712a having digital versions of both the PWM high resolution signal 1626a and also a digital version of speed pulses, e.g., 206a, 206b of FIG. 5.

A digital-to-analog converter 1714 can be coupled to receive the composite digital signal 1712a can be operable to generate an analog converted signal 1714a.

A current generator 1716 can receive the analog converted signal 1714a and can be operable to generate a current signal 1718 version of the analog converted signal 1714a.

With the signals 1710a, 1720a, 1726a received by the digital core and/or state machine 1712, the digital core and/or state machine 1712 can construct the signal 1712a with format of FIG. 5, including the speed pulses 206a, 206b and including the PWM high resolution pulses 504, with a format of FIG. 6, including the speed pulses 206a, 206b and including the equidistant high resolution pulses 604, with a format of FIG. 3, including the speed pulses 206a, 206b and including the constant number of high resolution pulses 304, or with a format of FIG. 8 or 9. To this end, in some embodiments, the digital core and/or state machine 1712 can include a digital version of the detection circuit 1340 of FIG. 13 having digital versions of both the PWM high resolution signal 1626a and also a digital version of speed pulses, e.g., 206a, 206b of FIG. 5.

In some embodiments, a speed detection module 1726 can be coupled to one of the digital converted signals, e.g. 1724a, and operable to generate a speed detect signal 1726a indicative of a speed of rotation of the ferromagnetic object 12 (or 60) of FIG. 1, in some embodiments, the speed signal detect signal 1726a can change operation of the digital core and/or state machine 1712 at rotation speeds above a pre-determine rotation speed, leaving only speed pulses in the current signal 1718 and disabling the high resolution pulses in the current signal 1718.

A magnetic field sensor 1740 is similar to the magnetic field sensor 1700 and can include circuit 1702, but uses the magnetic field sensing element arrangement 1360 instead of the magnetic field sensor arrangement 1301. Operation of the magnetic field sensor 1740 will be understood from discussion above.

Figure 18:
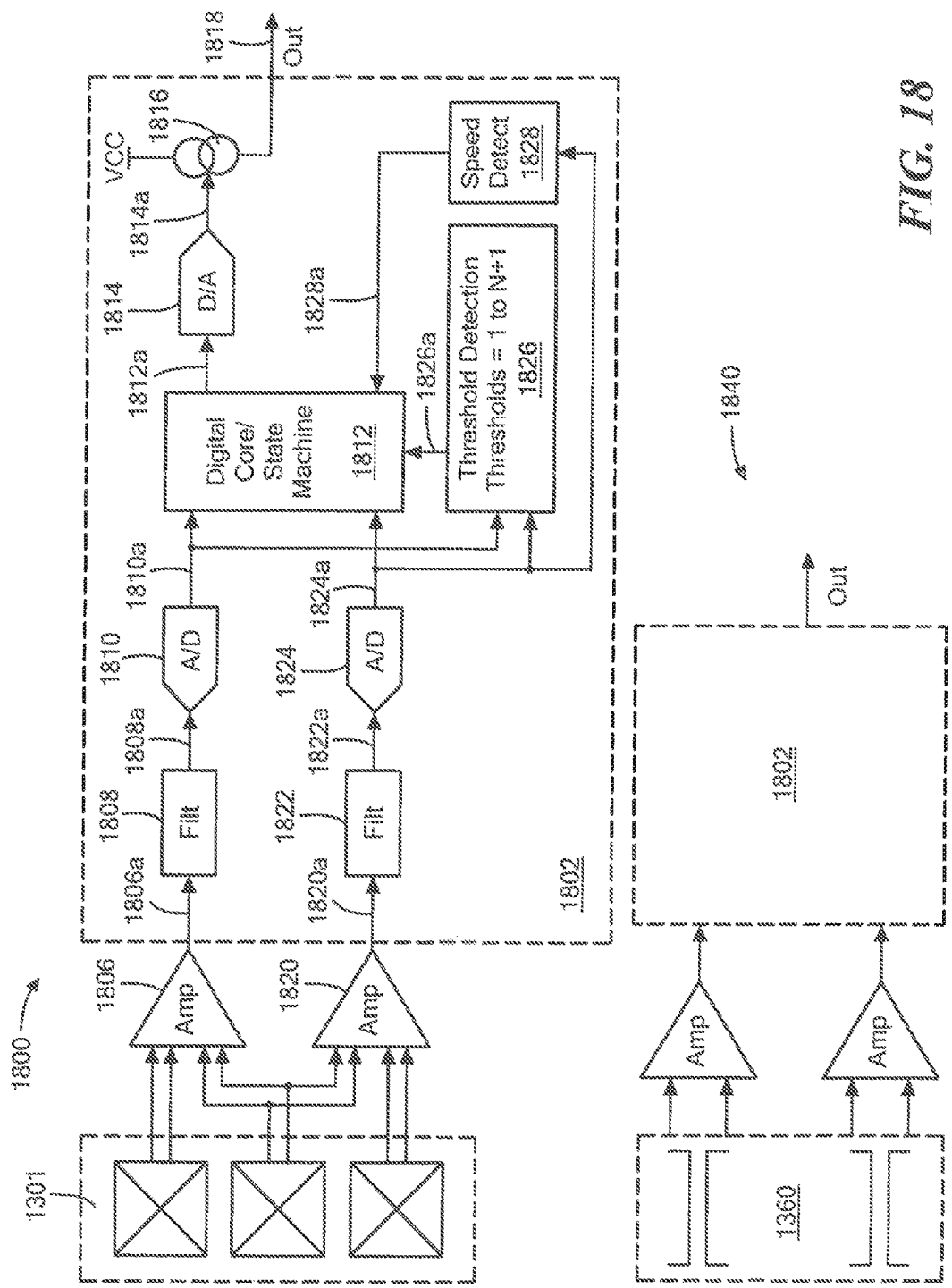
FIG. 18 is a block diagram showing an example of an electronic circuit that can be within a magnetic field sensor and that can generate a signal similar to the signal of FIG. 7.

Referring now to FIG. 18 in which like elements of FIGS. 13-17 are shown having like reference designations, magnetic field sensors 1800, 1840 can include the variety of different arrangements 1301, 1360 of magnetic field sensing elements. Other arrangements 1370, 1380 of FIGS. 13 and 14 are also possible but not shown.

In the magnetic field sensor 1800, with three planar Hall element arrangement 1301 as an example, two electronic channels can include respective amplifiers 1806, 1820 coupled to receive sensing element signals from the three Hall elements 1301 and configured to generate respective amplified signals 1806a, 1820a. Respective filters 1808, 1822 can be coupled to the amplified signals 1806a, 1820a, respectively, and can be operable to generate respective filtered signals 1808a, 1822a. Respective analog-to-digital (A/D) converters 1810, 1824 can be coupled to receive the filtered signals 1808a, 1822a, respectively, and. configured to generate digital converted signals 1810a, 1824a, respectively. A digital core and/or state machine 1812 can receive the digital converted signals 1810a, 1824a and can be operable to compute and generate a digital output signal 1812a.

A threshold detection module 1826 can receive the two digital converted signals 1810a, 1824a and can be operable to generate a digital threshold signal 1826a having any number of threshold values within peak-to-peak ranges of the digital converted signals 1810a, 1824a. The digital core and/or state machine 1812 can receive the threshold signal 1826a.

A digital-to-analog converter 1814 can be coupled to receive the composite digital signal 1812a can be operable to generate an analog converted signal 1814a.

A current generator 1816 can receive the analog converted signal 1814a and can be operable to generate a current signal 1818 version of the analog converted signal 1814a.

With the signals 1810a, 1824a, 1864a received by the digital core and/or state machine 1812, the digital core and/or state machine 1812 can construct the signal 1812a with format of FIG. 7, including the speed pulses 206a, 206b and including the threshold high resolution pulses 704. To this end, in some embodiments, the digital core and/or state machine 1812 can include a digital version of the detection circuit 1340 of FIG. 13.

In some embodiments, a speed detection module 1828 can be coupled to one of the digital converted signals, e.g., 1824a, and operable to generate a speed detect signal 1828a indicative of a speed of rotation of the ferromagnetic object 12 (or 60) of FIG. 1. In some embodiments, the speed signal detect signal 1828a can change operation of the digital core and/or state machine 1812 at rotation speeds above a pre-determine rotation speed, leaving only speed pulses in the current signal 1818 and disabling the high resolution pulses in the current signal 1818.

A magnetic field sensor 1840 is similar to the magnetic field sensor 1800 and can include circuit 1802, but uses the magnetic field sensing element arrangement 1360 instead of the magnetic field sensor arrangement 1301. Operation of the magnetic field sensor 1840 will be understood from discussion above.

Figure 19:
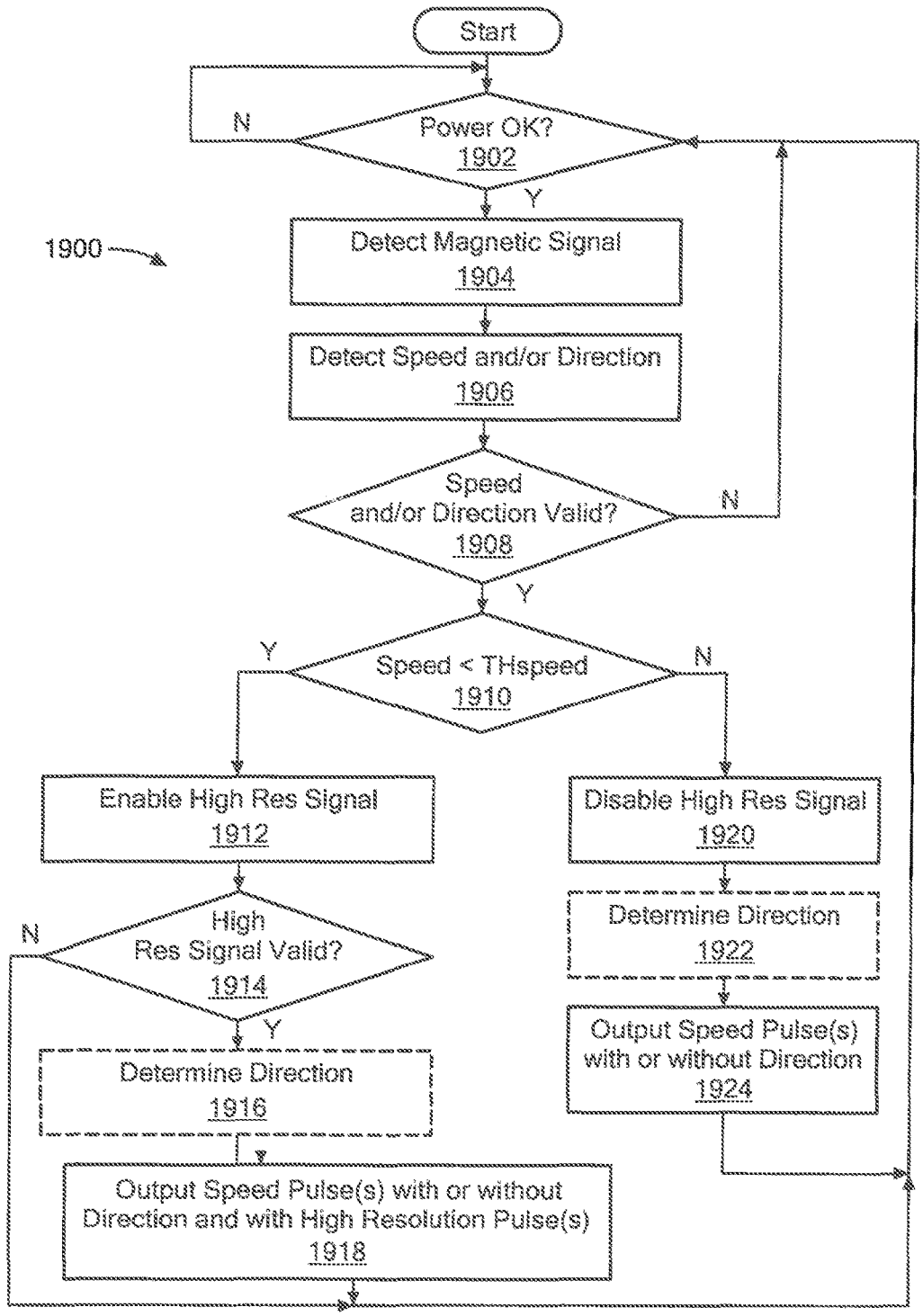
FIG. 19 is a flow chart showing a process that can be used in a magnetic field sensor to generate speed and/or direction information and also higher resolution pulses.

It should be appreciated that FIG. 19 shows a flowchart corresponding to the below contemplated technique which could be implemented in digital core and/or state machines of FIGS. 15-18 or the CORDIC modules of FIGS. 13 and 14. Rectangular elements, herein denoted "processing blocks," represent computer software instructions or groups of instructions, Diamond shaped elements (none shown but ae also rectangular), herein denoted "decision blocks," represent computer software instructions, or groups of instructions, which affect the execution of the computer software instructions represented by the processing blocks.

Referring now to FIG. 19, a process 1900, as shown, at relatively low speeds of rotation of the ferromagnetic object 12 (or 60) of FIG. 1, the provides high resolution pulses between speed pulses in accordance with FIGS. 3-9 and 13-18. The high resolution pulses can be omitted and the speed pulses can be retained. above a predetermined rotation speed of the rotating ferromagnetic object 12 (or 60) of FIG. 1. The magnetic field sensor 1300 is used in examples below. However any of the magnetic field sensors described herein can perform the method 1900

At block 1902, the magnetic field sensor, e.g., 1300, tests that the power supply to the magnetic field sensor is within acceptable limits, If the power supply is within the acceptable limits, then the process proceeds to block 1904.

At block 1904 the magnetic field sensor 1300 detects the magnetic field signals, e.g., the magnetic field signals 1304a, 1322a, or the magnetic field signals 1306a, 1325a.

At block 1906, the magnetic field sensor 1300 detects rotation speed and/or direction of the ferromagnetic object 12 (or 60) of FIG. 1.

At block 1908 the magnetic field sensor 1300 identifies if the speed and/or direction is/are valid.

In some embodiments, at block 1908, the magnetic field sensor 1330 can detect a vibration in the movement of the ferromagnetic object 12 (or 60) of FIG. 1. Some techniques for vibration detection are described in U.S. Pat. No. 7,772,838, issued Aug. 10, 2010, which is assigned to the assignee of the present invention, and which is incorporated by reference herein.

If a vibration is detected, in some embodiments, the output signal 1316 can be blanked.

If a vibration is detected, the signals in the magnetic field sensor can be deemed to be invalid, in which case the method can return to block 1902.

If the speed and/or direction are valid, then the process proceeds to block 1910.

At block 1910 the magnetic field sensor 1300 detects whether the rotational speed of the ferromagnetic object 12 (or 60) of FIG. 1 is less than a threshold speed, for example, one thousand RPM.

If the rotation speed is less than the threshold speed, then the. process proceeds to block 1912.

At block 1912 the high resolution signal is enabled.

At block 1914, it is detected if the high resolution signal is valid.

If the high resolution signal is valid, then the process proceeds to block 1916.

At block 1916, optionally, the magnetic field sensor can identify the direction of rotation.

At block 1918 speed pulse(s) with or without direction information, along with high resolution output pulse(s), are generated, for example, by the comparator 1312 and by the output protocol processor 1348 of FIG. 13.

At block 1910, if the rotation speed is not less than the threshold speed then the process proceeds to block 1920.

At block 1920, the high resolution signal is disabled, leaving only speed pulses, for example, the speed pulses 206a, 206b of FIG. 5.

At block 1922, optionally, the magnetic field sensor can identify the direction of rotation.

At block 1924 speed pulse(s) with or without direction information, are generated, for example, by the output protocol processor 1348 of FIG. 13 and the CORDIC processor 1308 is disabled, for example, by the speed detect signal 1326a.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A magnetic field sensor, comprising:
one or more magnetic field sensing elements operable to generate a respective one or more magnetic field signals proportional to a magnetic field associated with a ferromagnetic object capable of moving, the ferromagnetic object having ferromagnetic features, wherein each magnetic field signal has a plurality of magnetic field signal periods as the ferromagnetic object moves;
one or more circuit channels coupled to receive the one or more magnetic field signals, the one or more circuit channels configured to generate a respective one or more channel signals; and
an electronic circuit coupled to the one or more channel signals and operable to generate a first output signal comprising a plurality of speed pulses having a first plurality of state transitions and a plurality of signal pulses having a second plurality of state transitions, the plurality of speed pulses representative of a rate of movement of the ferromagnetic object, wherein the plurality of speed pulses have a plurality of periods equal to, or equal to one half of, the plurality of magnetic field signal periods, wherein the plurality of signal pulses occurs between adjacent pairs of the plurality of speed pulses, and wherein the second plurality of state transitions comprises at least four state transitions.

2. The magnetic field sensor of claim 1, wherein the plurality of signal pulses comprises a plurality of PWM pulses.

3. The magnetic field sensor of claim 2, wherein the plurality of PWM pulses comprises a plurality of PWM pulses with pulse widths that change in relation to an amplitude of the magnetic field signals at times along the magnetic field signal.

4. The magnetic field sensor of claim 2, wherein the plurality of PWM pulses comprises a linear plurality of PWM pulses with pulse widths that change linearly within each magnetic field signal period.

5. The magnetic field sensor of claim 4, wherein the linear plurality of PWM pulses has first and second directions of pulse width changes with time, the first and second directions representative of first and second directions of motion of the ferromagnetic object.

6. The magnetic field sensor of claim 1, wherein the plurality of signal pulses comprises a predetermined number of pulses.

7. The magnetic field sensor of claim 1, wherein the plurality of signal pulses comprises a plurality of threshold pulses, wherein each threshold pulse occurs proximate to a time when the magnetic field signal crosses a respective threshold.

8. The magnetic field sensor of claim 1, wherein the plurality of signal pulses comprises a plurality of equidistant pulses, equidistant from each other in time, wherein the number of equidistant pulses varies in accordance with a speed of movement of the ferromagnetic object.

9. The magnetic field sensor of claim 1, wherein the electronic circuit comprises:
a speed detection circuit coupled to at least one of circuit channels, wherein the speed detection circuit is operable to detect a speed of movement of the ferromagnetic object, and further operable to disable the first output signal and to generate a second output signal having the plurality of speed pulses but not having the plurality of signal pulses if the detected speed of the movement is greater than a predetermined threshold speed.

10. The magnetic field sensor of claim 1, wherein the plurality of signal pulses occurs within each half period of the plurality of magnetic field signal periods.

11. The magnetic field sensor of claim 1, wherein the plurality of speed pulses has a larger amplitude than the plurality of signal pulses.

12. A method used in a magnetic field sensor, comprising:
generating, with one or more magnetic field sensing elements, a respective one or more magnetic field signals proportional to a magnetic field associated with a ferromagnetic object capable of moving, the ferromagnetic object having ferromagnetic features, wherein each magnetic field signal has a plurality of magnetic field signal periods as the ferromagnetic object moves;
generating one or more channel signals with a respective one or more circuit channels coupled to receive the one or more magnetic field signals; and
generating, with an electronic circuit coupled to the one or more circuit channels, a first output signal comprising a plurality of speed pulses having a first plurality of state transitions and a plurality of signal pulses having a second plurality of state transitions, the plurality of speed pulses representative of a rate of movement of the ferromagnetic object, wherein the plurality of speed pulses have a plurality of periods equal to, or equal to one half of, the plurality of magnetic field signal periods, wherein the plurality of signal pulses occurs between adjacent pairs of the plurality of speed pulses, and wherein the second plurality of state transitions comprises at least four state transitions between the adjacent pairs of the plurality of speed pulses.

13. The method of claim 12, wherein the plurality of signal pulses comprises a plurality of PWM pulses.

14. The method of claim 13, wherein the plurality of PWM pulses comprises a plurality of PWM pulses with pulse widths that change in relation to an amplitude of the magnetic field signal at times along the magnetic field signal.

15. The method of claim 13, wherein the plurality of PWM pulses comprises a linear plurality of PWM pulses with pulse widths that change linearly within each magnetic field signal period.

16. The method of claim 15, wherein the linear plurality of PWM pulses has first and second directions of pulse width changes with time, the first and second directions representative of first and second directions of motion of the ferromagnetic object.

17. The method of claim 12, wherein the plurality of signal pulses comprises a predetermined number of pulses.

18. The method of claim 12, wherein the plurality of signal pulses comprises a plurality of threshold pulses, wherein each threshold pulse occurs proximate to a time when the magnetic field signal crosses a respective threshold.

19. The method of claim 12, wherein the plurality of signal pulses comprises a plurality of equidistant pulses, equidistant from each other in time, wherein the number of equidistant pulses varies in accordance with a speed of movement of the ferromagnetic object.

20. The method of claim 12, wherein the electronic circuit comprises:
a speed detection circuit coupled to at least one of circuit channels, wherein the speed detection circuit is operable to detect a speed of movement of the ferromagnetic object, and further operable to disable the first output signal and to generate a second output signal having the plurality of speed pulses but not having the plurality of signal pulse if the detected speed of the movement is greater than a predetermined threshold speed.

21. The method of claim 12, wherein the plurality of signal pulses occurs within each half period of the plurality of magnetic field signal periods.

22. The method of claim 12, wherein the plurality of speed pulses has a larger amplitude than the plurality of signal pulses.

23. A magnetic field sensor, comprising:
means for generating, with one or more magnetic field sensing elements, a respective one or more magnetic field signals proportional to a magnetic field associated with a ferromagnetic object capable of moving, the ferromagnetic object having ferromagnetic features, wherein each magnetic field signal has a plurality of magnetic field signal periods as the ferromagnetic object moves;

means for generating one or more channel signals with a respective one or more circuit channels coupled to receive the one or more magnetic field signals; and means for generating, with an electronic circuit coupled to the one or more circuit channels, a first output signal comprising a plurality of speed pulses having a first plurality of state transitions and a plurality of signal pulses having a second plurality of state transitions, the plurality of speed pulses representative of a rate of movement of the ferromagnetic object, wherein the plurality of speed pulses have a plurality of periods equal to, or equal to one half of, the plurality of magnetic field signal periods, wherein the plurality of signal pulses occurs between proximate pairs of the plurality of speed pulses, and wherein the second plurality of state transitions comprises at least four state transitions between the adjacent pairs of the plurality of speed pulses.

24. The magnetic field sensor of claim 23, wherein the plurality of signal pulses comprises a plurality of PWM pulses.

25. The magnetic field sensor of claim 24, wherein the plurality of PWM pulses comprises a plurality of PWM pulses with pulse widths that change in relation to an amplitude of the magnetic field signals at times along the magnetic field signal.

26. The magnetic field sensor of claim 24, wherein the plurality of PWM pulses comprises a linear plurality of PWM pulses with pulse widths that change linearly within each magnetic field signal period.

27. The magnetic field sensor of claim 26, wherein the linear plurality of PWM pulses has first and second directions of pulse width changes with time, the first and second directions representative of first and second directions of motion of the ferromagnetic object.

28. The magnetic field sensor of claim 23, wherein the plurality of signal pulses comprises a predetermined number of pulses.

29. The magnetic field sensor of claim 23, wherein the plurality of signal pulses comprises a plurality of threshold pulses, wherein each threshold pulse occurs proximate to a time when the magnetic field signal crosses a respective threshold.

30. The magnetic field sensor of claim 23, wherein the plurality of signal pulses comprises a plurality of equidistant pulses, equidistant from each other in time, wherein the number of equidistant pulses varies in accordance with a speed of movement of the ferromagnetic object.

31. The magnetic field sensor of claim 23, wherein the electronic circuit comprises:

means for detecting a speed of movement of the ferromagnetic object;

means for disabling the first output signal; and means for generating a second output signal having the plurality of speed pulses but not having the plurality of signal pulses different than the first output signal if the detected speed of the movement is greater than a predetermined threshold speed.

32. The magnetic field sensor of claim 23, wherein the plurality of signal pulses occurs within each half period of the plurality of magnetic field signal periods.

33. The magnetic field sensor of claim 23, wherein the plurality of speed pulses has a larger amplitude than the plurality of signal pulses.

* * * * *

UNITED STATES PATENT AND TRADEMARK OFFICE
CERTIFICATE OF CORRECTION

PATENT NO. : 10,495,485 B2
APPLICATION NO. : 15/596514
DATED : December 3, 2019
INVENTOR(S) : Eric Burdette et al.

Page 1 of 2

It is certified that error appears in the above-identified patent and that said Letters Patent is hereby corrected as shown below:

In the Specification

Column 2, Line 28 delete "PACs" and replace with --DACs--.

Column 2, Line 45 delete "puke" and replace with --pulse--.

Column 3, Line 4 delete "arrangement" and replace with --arrangements--.

Column 3, Line 59 delete "with," and replace with --with--.

Column 3, Line 60 delete "includes" and replace with --include--.

Column 14, Line 34 delete "pukes" and replace with --pulses--.

Column 16, Line 21 delete "can e" and replace with --can be--.

Column 18, Line 13 delete "muitivibrators" and replace with --multivibrators--.

Column 18, Line 21 delete "1416*na*can" and replace with --1416*na* can--.

Column 19, Line 7 delete "predetermine" and replace with --predetermined--.

Column 20, Line 2 delete "can" and replace with --and can--.

Column 21, Line 8 delete "can." and replace with --can--.

Column 21, Line 39 delete "variety" and replace with --variety of--.

Column 21, Line 41 delete "hut" and replace with --but--.

Signed and Sealed this
Eighth Day of September, 2020

Andrei Iancu
*Director of the United States Patent and Trademark Office*

Column 22, Line 29-30 delete "pre-determine" and replace with --pre-determined--.

Column 23, Line 2 delete "can" and replace with --and can--.

Column 23, Line 37 delete "instructions," and replace with --instructions.--.

Column 23, Line 37-38 delete "elements (none shown but ae also rectangular)," and replace with --elements,--.